US012247434B2

(12) United States Patent
Buchalo et al.

(10) Patent No.: US 12,247,434 B2
(45) **Date of Patent: *Mar. 11, 2025**

(54) SHEAR THICKENING FLUID BASED DOOR CONTROL METHOD AND MECHANISM

(71) Applicant: Moshun, LLC, Oak Brook, IL (US)

(72) Inventors: John Edward Buchalo, South Barrington, IL (US); Mario F. DeRango, Cary, IL (US); Gary W. Grube, Barrington Hills, IL (US); Jason K. Resch, Warwick, RI (US); Terence Michael Lydon, Westmont, IL (US); Timothy John Boundy, Deer Park, IL (US); Darren Michael Boundy, Long Grove, IL (US); Eric McHugh, Naperville, IL (US); Richard Michael Lang, Howey In The Hills, FL (US); Richard A. Herbst, Clarendon Hills, IL (US); Steven Michael Barger, Bartlett, IL (US); Kurt Estes, Lake Zurich, IL (US); Evan Anderson, Naples, FL (US); Susan Tomilo, New Buffalo, MI (US); Wilfredo Gonzalez, Jr., Plainfield, IL (US); David Schuda, Wheaton, IL (US); George L. Wilson, IV, Kalamazoo, MI (US); Daniel J. Gardner, Wayne, IL (US)

(73) Assignee: Moshun, LLC, Oak Brook, IL (US)

(*) Notice: Subject to any disclaimer, the term of this patent is extended or adjusted under 35 U.S.C. 154(b) by 152 days.

This patent is subject to a terminal disclaimer.

(21) Appl. No.: 18/134,425

(22) Filed: Apr. 13, 2023

(65) Prior Publication Data

US 2023/0340823 A1 Oct. 26, 2023

Related U.S. Application Data

(60) Provisional application No. 63/335,123, filed on Apr. 26, 2022.

(51) Int. Cl.

*E05F 5/10* (2006.01)
*E05F 5/02* (2006.01)
*E05F 7/00* (2006.01)

(52) U.S. Cl.

CPC .................. *E05F 5/10* (2013.01); *E05F 5/02* (2013.01); *E05F 7/00* (2013.01);

(Continued)

(58) Field of Classification Search

CPC ...... E05F 5/02; E05F 7/00; E05F 5/10; E05Y 2201/212; E05Y 2201/264; E05Y 2400/20

(Continued)

(56) References Cited

U.S. PATENT DOCUMENTS 1,704,217 A 3/1929 Rosenthal
1,736,175 A 11/1929 Rosenthal (Continued)

FOREIGN PATENT DOCUMENTS

DE 202006006422 U1 8/2006
DE 202006011846 U1 12/2007

(Continued)

*Primary Examiner* — Jorge L Carrasquillo

(74) *Attorney, Agent, or Firm* — Gary W. Grube

(57) ABSTRACT

A method for execution by a computing entity includes interpreting a fluid flow response from fluid flow sensors to produce a piston position of a piston associated with a head unit device. The head unit device includes a chamber filled with a shear thickening fluid (STF). The method further includes determining a door position based on the piston position. The method further includes determining parameters for wireless signals based on the door position. The method further includes facilitating utilization of the parameters for the wireless signals to promote successful communication of status and/or control of the door via the wireless signals.

19 Claims, 15 Drawing Sheets

(52) U.S. Cl.
CPC ... *E05Y 2201/212* (2013.01); *E05Y 2201/256* (2013.01); *E05Y 2201/264* (2013.01); *E05Y 2400/20* (2013.01)

(58) Field of Classification Search
USPC .......................................................... 318/466
See application file for complete search history.

(56) References Cited

U.S. PATENT DOCUMENTS

| | | | | |
|---|---|---|---|---|
| 1,965,806 | A | 7/1934 | Riggins | |
| 2,740,308 | A | 4/1956 | Blanchard | |
| 3,284,841 | A | 11/1966 | Patriquin | |
| 3,487,494 | A | 1/1970 | De Baan | |
| 3,489,087 | A | 1/1970 | Soderberg | |
| 3,979,790 | A | 9/1976 | Chiarappa | |
| 4,452,437 | A | 6/1984 | Lochner | |
| 4,590,639 | A | 5/1986 | Fritsche | |
| 5,078,552 | A | 1/1992 | Albel | |
| 5,924,714 | A | 7/1999 | Farris | |
| 7,628,257 | B1 | 12/2009 | Lu | |
| 7,825,045 | B1 | 11/2010 | Wagner | |
| 7,918,167 | B2 | 4/2011 | Tanielian et al. | |
| 8,276,497 | B2 | 10/2012 | Hunn | |
| 8,499,908 | B2 | 8/2013 | Barker et al. | |
| 8,943,652 | B2 | 2/2015 | Bacchetti | |
| 9,303,709 | B2 * | 4/2016 | Manes | F16F 9/10 |
| 9,453,550 | B2 | 9/2016 | Smith et al. | |
| 9,498,690 | B2 | 11/2016 | Carlson et al. | |
| 9,970,831 | B2 | 5/2018 | Shih | |
| 10,017,082 | B2 | 7/2018 | Zwaan | |
| 10,161,173 | B2 | 12/2018 | Kruedener et al. | |
| 10,371,097 | B2 | 8/2019 | Sellinger et al. | |
| 10,443,678 | B2 | 10/2019 | Galindo Rosales et al. | |
| 10,462,578 | B2 | 10/2019 | Hoskins et al. | |
| 10,480,281 | B2 | 11/2019 | Al-Olayan et al. | |
| 10,580,231 | B2 | 3/2020 | Lin | |
| 10,633,905 | B2 | 4/2020 | Feng | |
| 10,920,474 | B2 | 2/2021 | Shinmura | |
| 2002/0010977 | A1 | 1/2002 | Salice | |
| 2003/0155196 | A1 | 8/2003 | Nishiyama | |
| 2003/0213663 | A1 | 11/2003 | Salice | |
| 2004/0068833 | A1 | 4/2004 | Sawa | |
| 2005/0034269 | A1 | 2/2005 | Jinbo | |
| 2008/0272554 | A1 * | 11/2008 | Nagel | F15B 15/1433 277/434 |
| 2009/0119873 | A1 | 5/2009 | Bassi | |
| 2009/0241287 | A1 | 10/2009 | Reid | |
| 2010/0162521 | A1 | 7/2010 | Pyo | |
| 2010/0170062 | A1 | 7/2010 | Kim | |
| 2010/0287729 | A1 | 11/2010 | Jin | |
| 2010/0319260 | A1 | 12/2010 | Sawa | |
| 2013/0097805 | A1 | 4/2013 | Bland | |
| 2014/0352111 | A1 | 12/2014 | Ng | |
| 2015/0040998 | A1 | 2/2015 | Gilstad | |
| 2016/0215552 | A1 | 7/2016 | Lohken et al. | |
| 2017/0096850 | A1 | 4/2017 | Hopkins | |
| 2017/0210458 | A1 | 7/2017 | Tothill et al. | |
| 2017/0226682 | A1 | 8/2017 | Duckworth | |
| 2017/0304057 | A1 | 10/2017 | Bichler | |
| 2018/0266512 | A1 | 9/2018 | Zimmer | |
| 2019/0040667 | A1 | 2/2019 | Feng | |
| 2019/0128362 | A1 | 5/2019 | Naserimojarad | |
| 2019/0371090 | A1 | 12/2019 | Lin et al. | |
| 2020/0011110 | A1 | 1/2020 | Boundy | |
| 2020/0240190 | A1 | 7/2020 | Held | |
| 2022/0220788 | A1 | 7/2022 | Boundy | |
| 2022/0221019 | A1 | 7/2022 | Boundy | |
| 2022/0221020 | A1 | 7/2022 | Boundy | |
| 2023/0137799 | A1 * | 5/2023 | Boundy | F16F 9/516 |

FOREIGN PATENT DOCUMENTS

| | | | |
|---|---|---|---|
| DE | 102008014329 | A1 | 9/2009 |
| EP | 0063635 | B1 | 2/1985 |
| JP | 2003266222 | A | 9/2003 |
| JP | 2004353712 | A | 12/2004 |
| JP | 2009531631 | A | 9/2009 |
| JP | 2014118303 | A | 6/2014 |
| KR | 2020040018600 | | 6/2006 |
| WO | 2007116273 | A1 | 10/2007 |
| WO | 2020103458 | A1 | 5/2020 |

* cited by examiner

SHEAR THICKENING FLUID BASED DOOR CONTROL METHOD AND MECHANISM

CROSS-REFERENCE TO RELATED APPLICATIONS

The present U.S. Utility Patent Application claims priority pursuant to 35 U.S.C. § 119(e) to U.S. Provisional Application No. 63/335,123, entitled "SHEAR THICKENING FLUID BASED DOOR CONTROL METHOD AND MECHANISM" filed Apr. 26, 2022, which is hereby incorporated herein by reference in its entirety and made part of the present U.S. Utility Patent Application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to systems that measure and control mechanical movement and more particularly to sensing and controlling of a linear and/or rotary movement mechanism that includes a chamber with dilatant fluid (e.g., a shear thickening fluid).

Description of Related Art

Many mechanical mechanisms are subject to undesired movement that can lead to annoying sounds, property damage and/or loss, and personal injury and even death. Desired and undesired movements of the mechanical mechanisms may involve a wide range of forces. A need exists to control the wide range of forces to solve these problems.

BRIEF DESCRIPTION OF THE SEVERAL VIEWS OF THE DRAWING(S)

Figure 8A:
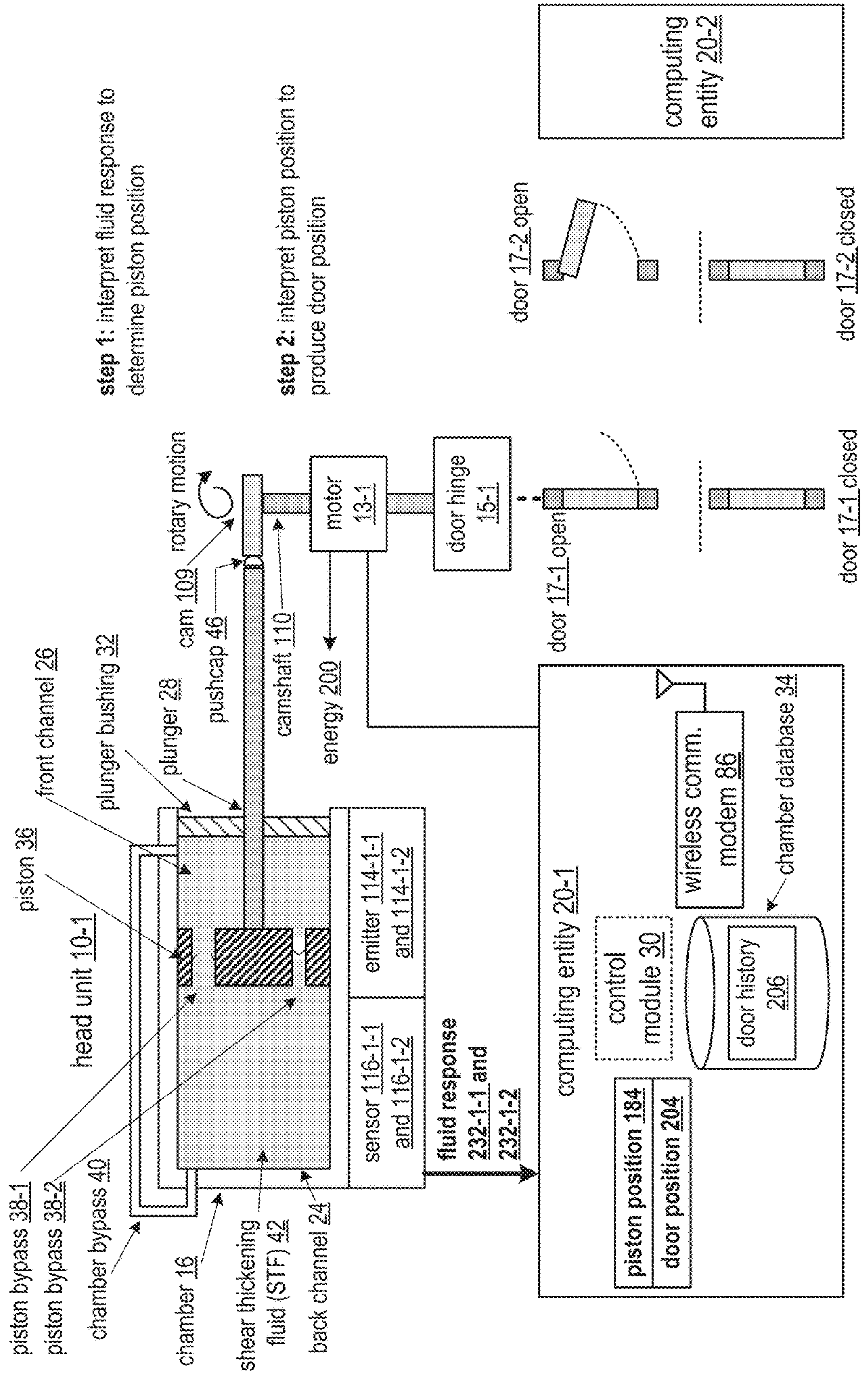
Figure 8B:
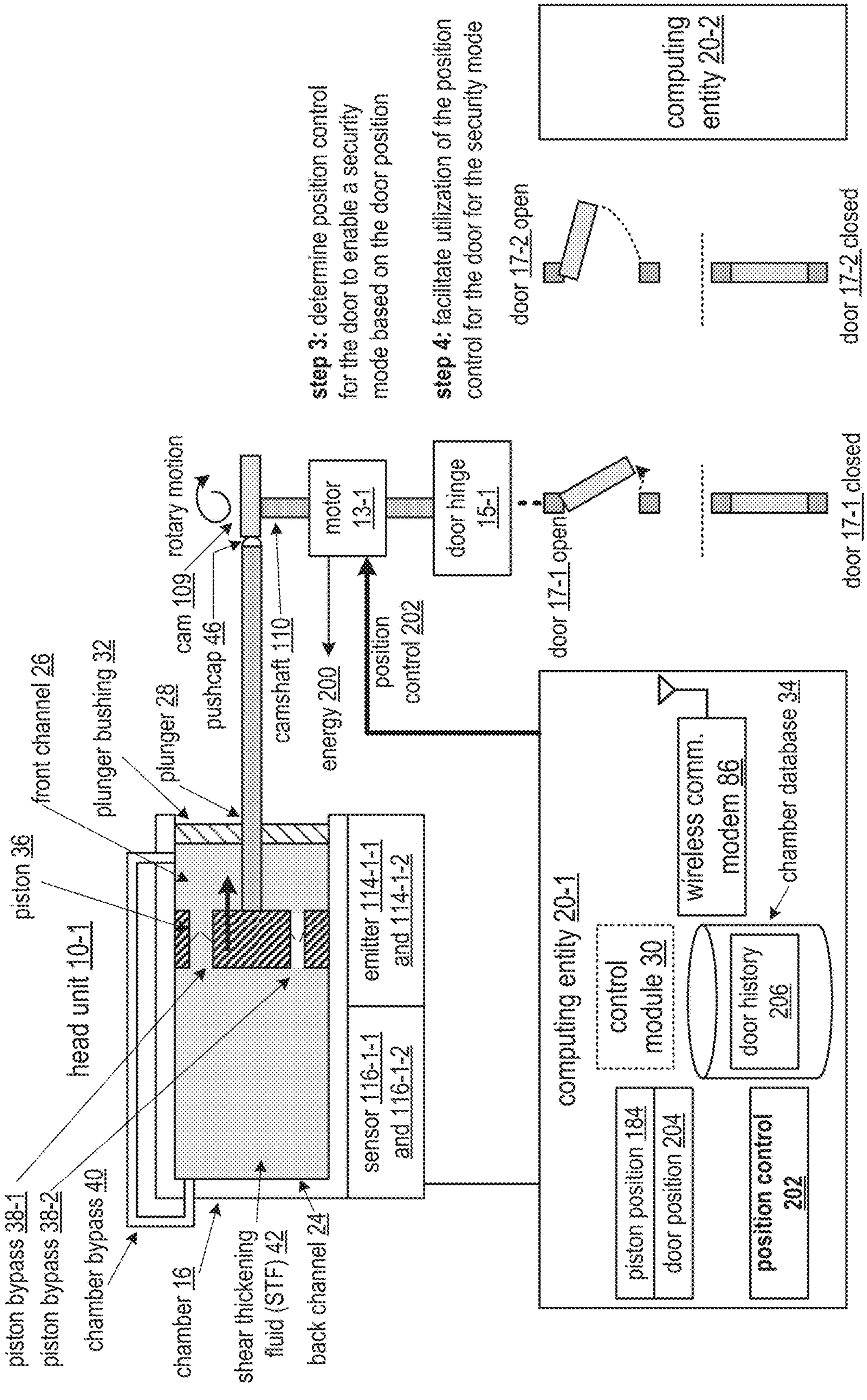
Figure 9A:
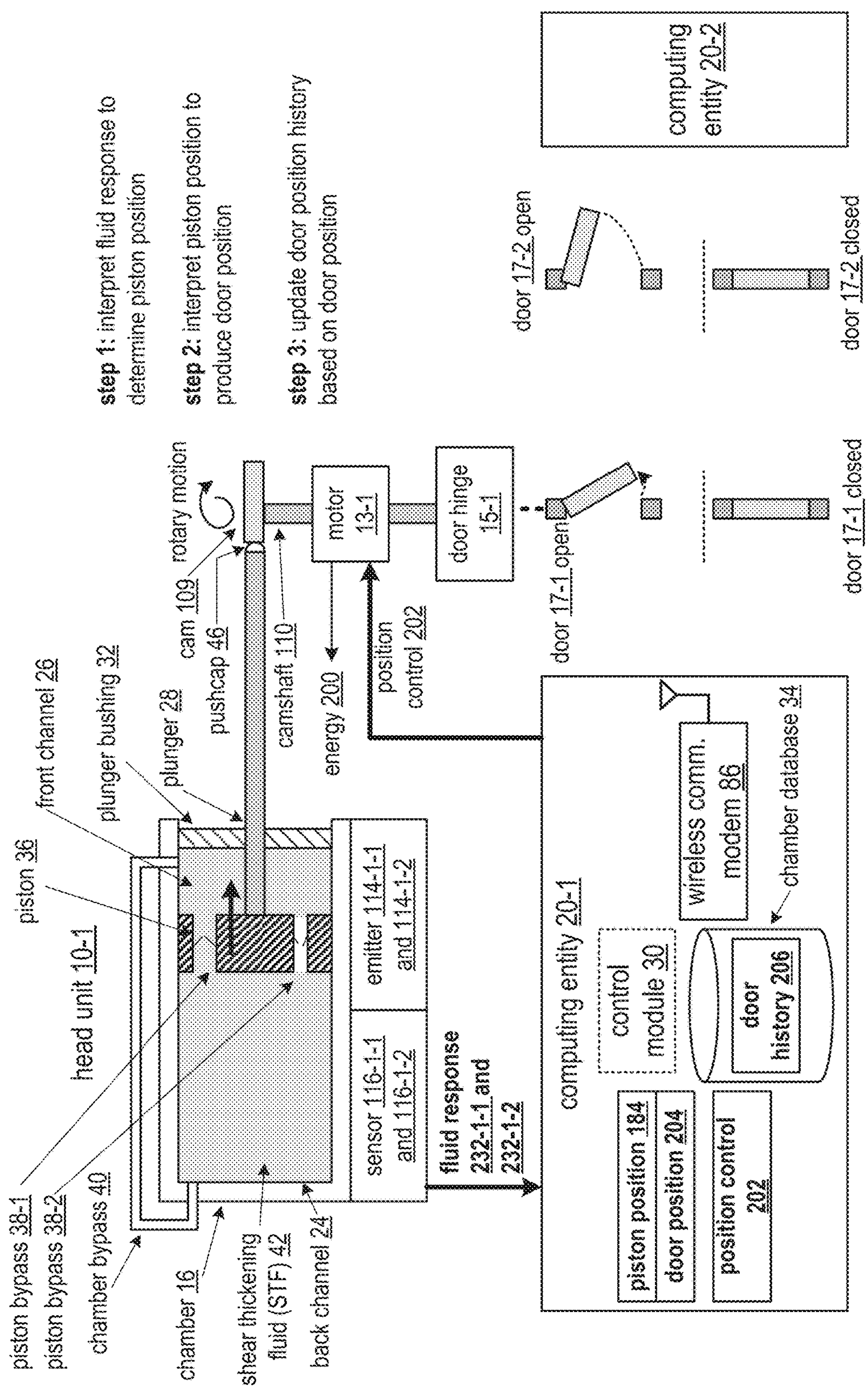
Figure 9B:
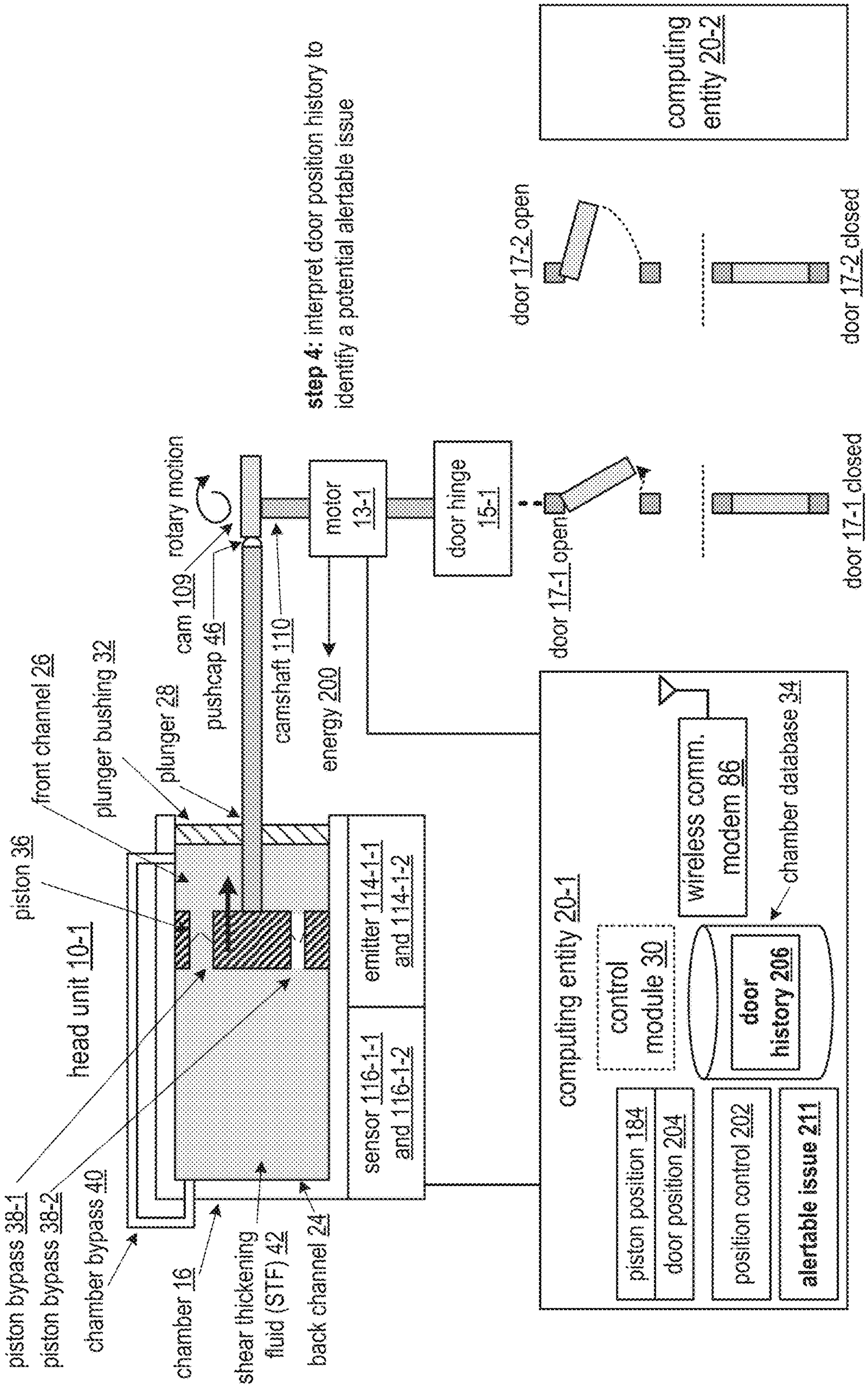

FIGS. 8A-8B are schematic block diagrams of another embodiment of a mechanical and computing system illustrating another example of controlling operational aspects in accordance with the present invention; and FIGS. 9A-9B are schematic block diagrams of another embodiment of a mechanical and computing system illustrating another example of controlling operational aspects in accordance with the present invention.

DETAILED DESCRIPTION OF THE INVENTION

Figure 1A:
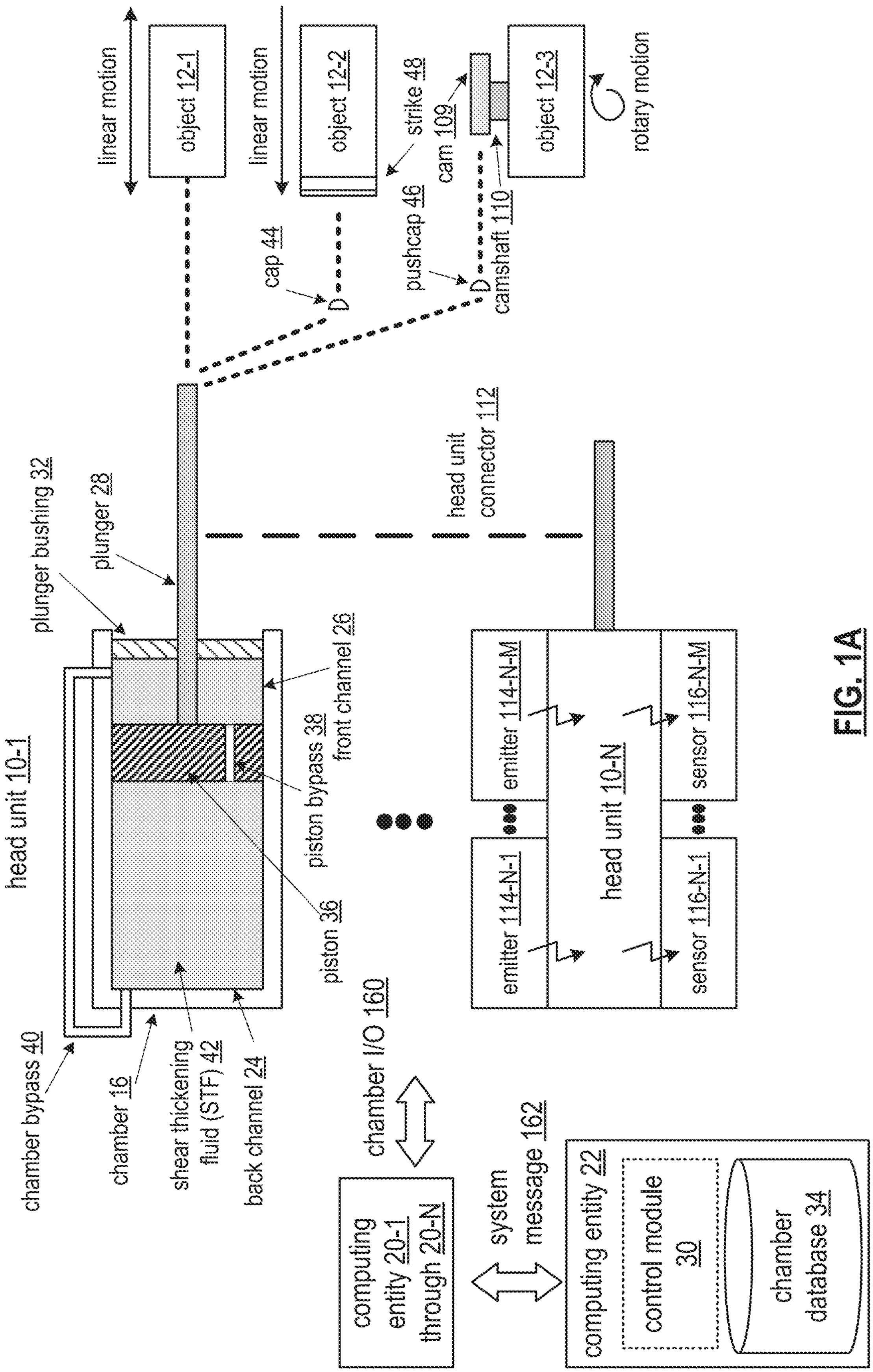
FIG. 1A is a schematic block diagram of an embodiment of a mechanical and computing system in accordance with the present invention.

FIG. 1A is a schematic block diagram of an embodiment of a mechanical and computing system that includes a set of head units 10-1 through 10-N, objects 12-1 through 12-3, computing entities 20-1 through 20-N associated with the head units 10-1 through 10-N, and a computing entity 22. The objects include any object that has mass and moves. Examples of an object include a door, an aircraft wing, a portion of a building support mechanism, and a particular drivetrain, etc.

The cross-sectional view of FIG. 1A illustrates a head unit that includes a chamber 16, a piston 36, a plunger 28, a plunger bushing 32, and a chamber bypass 40. The chamber 16 contains a shear thickening fluid (STF) 42. The chamber 16 includes a back channel 24 and a front channel 26, where the piston partitions the back channel 24 and the front channel 26. The piston 36 travels axially within the chamber 16. The chamber 16 may be a cylinder or any other shape that enables movement of the piston 36 and compression of the STF 42. The STF 42 is discussed in greater detail with reference to FIGS. 1B and 1C.

The plunger bushing 32 guides the plunger 28 into the chamber 16 in response to force from the object 12-1. The plunger bushing 32 facilitates containment of the STF within the chamber 16. The plunger bushing 32 remains in a fixed position relative to the chamber 16 when the force from the object moves the piston 36 within the chamber 16. In an embodiment the plunger bushing 32 includes an O-ring between the plunger bushing 32 and the chamber 16. In another embodiment the plunger bushing 32 includes an O-ring between the plunger bushing 32 and the plunger 28.

The piston 36 includes a piston bypass 38 between opposite sides of the piston to facilitate flow of a portion the STF between the opposite sides of the piston (e.g., between the back channel 24 and the front channel 26) when the piston travels through the chamber in an inward or an outward direction.

Alternatively, or in addition to, the chamber bypass 40 is configured between opposite ends of the chamber 16, wherein the chamber bypass 40 facilitates flow of a portion of the STF between the opposite ends of the chamber when the piston travels through the chamber in the inward or outward direction (e.g., between the back channel 24 and the front channel 26).

In alternative embodiments, the piston bypass 38 and the chamber bypass 40 includes mechanisms to enable STF flow in one direction and not an opposite direction. In further alternative embodiments, a control valve within the piston bypass 38 and/or the chamber bypass 40 controls the STF flow between the back channel 24 and the front channel 26. Each bypass includes one or more of a one-way check valve and a variable flow valve.

The plunger 28 is operably coupled to a corresponding object by one of a variety of approaches. A first approach includes a direct connection of the plunger 28 to the object 12-1 such that linear motion in any direction couples from the object 12-1 to the plunger 28. A second approach includes the plunger 28 coupled to a cap 44 which receives a one way force from a strike 48 attached to the object 12-2. A third approach includes a pushcap 46 that receives a force from a rotary-to-linear motion conversion component that is attached to the object 12-3. In an example, the object 12-3 is connected to a camshaft 110 which turns a cam 109 to strike the pushcap 46.

In an embodiment, two or more of the head units are coupled by a head unit connector 112. When so connected, actuation of a piston in a first head unit is essentially replicated in a piston of a second head unit. The head unit connector 112 includes a mechanical element between plungers of the two or more head units and/or direct connection of two or more plungers to a common object. For example, plunger 28 of head unit 10-1 and plunger 28 of head unit 10-2 are directly connected to object 12-1 when utilizing a direct connection.

Further associated with each head unit is a set of emitters and a set of sensors. For example, head unit 10-N includes a set of emitters 114-N-1 through 114-N-M and a set of sensors 116-N-1 through 116-N-M. Emitters includes any type of energy and or field emitting device to affect the STF, either directly or indirectly via other nanoparticles suspended in the STF. Examples of emitter categories include light, audio, electric field, magnetic field, wireless field, etc. Specific examples of fluid manipulation emitters include a variable flow valve associated with a bypass or injector or similar, a mechanical vibration generator, an image generator, a light emitter, an audio transducer, a speaker, an ultrasonic sound transducer, an electric field generator, a magnetic field generator, and a radio frequency wireless field transmitter. Specific examples of magnetic field emitters include a Helmholtz coil, a Maxwell coil, a permanent magnet, a solenoid, a superconducting electromagnet, and a radio frequency transmitting coil.

Sensors include any type of energy and/or field sensing device to output a signal that represents a reaction, motion or position of the STF. Examples of sensor categories include bypass valve position, mechanical position, image, light, audio, electric field, magnetic field, wireless field, etc. Specific examples of fluid flow sensors include a valve opening detector associated with the chamber 16 or any type of bypass (e.g., piston bypass 38, chamber bypass 40, a reservoir injector, or similar), a mechanical position sensor, an image sensor, a light sensor, an audio sensor, a microphone, an ultrasonic sound sensor, an electric field sensor, a magnetic field sensor, and a radio frequency wireless field sensor. Specific examples of magnetic field sensors include a Hall effect sensor, a magnetic coil, a rotating coil magnetometer, an inductive pickup coil, an optical magnetometry sensor, a nuclear magnetic resonance sensor, and a caesium vapor magnetometer.

The computing entities 20-1 through 20-N are discussed in detail with reference to FIG. 2A. The computing entity 22 includes a control module 30 and a chamber database 34 to facilitate storage of history of operation, desired operations, and other aspects of the system.

In an example of operation, the head unit 10-1 controls motion of the object 12-1 and includes the chamber 16 filled at least in part with the shear thickening fluid 42, the piston 36 housed at least partially radially within the chamber 16, and the piston 36 is configured to exert pressure against the shear thickening fluid 42 in response to movement of the piston 36 from a force applied to the piston from the object 12-1. The movement of the piston 36 includes one of traveling through the chamber 16 in an inward direction or traveling through the chamber 16 in an outward direction. The STF is configured to have a decreasing viscosity in response to a first range of shear rates and an increasing viscosity in response to a second range of shear rates.

The shear thickening fluid 42 (e.g., dilatant non-Newtonian fluid) has nanoparticles of a specific dimension that are mixed in a carrier fluid or solvent. Force applied to the shear thickening fluid 42 results in these nanoparticles stacking up, thus stiffening and acting more like a solid than a flowable liquid when a shear threshold is reached. In particular, viscosity of the shear thickening fluid 42 rises significantly when shear rate is increased to a point of the shear threshold. The relationship between viscosity and shear rates is discussed in greater detail with reference to FIGS. 1A and 1B.

In another example of operation, the object 12-1 applies an inward motion force on the plunger 28 which moves the piston 36 in words within the chamber 16. As the piston moves inward, shear rate of the shear thickening fluid 42 changes. A sensor 116-1-1 associated with the chamber 16 of the head unit 10-1 outputs chamber I/O 160 to the computing entity 20-1, where the chamber I/O 160 includes a movement data associated with the STF 42 as a result of the piston 36 moving inwards. Having received the chamber I/O 160, the computing entity 20-1 interprets the chamber I/O 160 to reproduce the movement data.

The computing entity 20-1 outputs the movement data as a system message 162 to the computing entity 22. The control module 30 stores the movement data in the chamber database 34 and interprets the movement data to determine whether to dynamically adjust the viscosity of the shear thickening fluid. Dynamic adjustment of the viscosity results in dynamic control of the movement of the piston 36, the plunger 28, and ultimately the object 12-1. Adjustment of the viscosity affects velocity, acceleration, and position of the piston 36.

The control module 30 determines whether to adjust the viscosity based on one or more desired controls of the object 12-1. The desired controls include accelerating, deaccelerating, abruptly stopping, continuing on a current trajectory, continuing at a constant velocity, or any other movement control. For example, the control module 30 determines to abruptly stop the movement of the object 12-1 when the object 12-1 is a door and the door is detected to be closing at a rate above a maximum closing rate threshold level and when the expected shear rate versus viscosity of the shear thickening fluid 42 requires modification (e.g., boost the viscosity now to slow the door from closing too quickly).

When determining to modify the viscosity, the control module 30 outputs a system message 162 to the computing entity 20-1, where the system message 162 includes instructions to immediately boost the viscosity beyond the expected shear rate versus viscosity of the shear thickening fluid 42. Alternatively, the system message 162 includes specific information on the relationship of viscosity versus shear rate.

Having received the system message 162, the computing entity 20-1 determines a set of adjustments to make with regards to the shear thickening fluid 42 within the chamber 16. The set of adjustments includes one or more of adjusting STF 42 flow through the chamber bypass 40, adjusting STF 42 flow through the piston bypass 38, and activating an emitter of a set of emitters 114-1-1 through 114-N−1. The flow adjustments include regulating within a flow range, stopping, starting, and allowing in one particular direction. For example, the computing entity 20-1 determines to activate emitter 114-1-1 to produce a magnetic field such as to interact with magnetic nanoparticles within the STF 42 to raise the viscosity. The computing entity 20-1 issues another chamber I/O 160 to the emitter 114-1-1 to initiate a magnetic influence process to boost the viscosity of the STF 42.

In an alternative embodiment, the computing entity 22 issues another system message 162 to two or more computing entities (e.g., 20-1 and 20-2) to boost the viscosity for corresponding head units 10-1 and 10-2 when the head unit connector 112 connects head units 10-1 and 10-2 and both head units are controlling the motion of the object 12-1. For instance, one of the head units informs the computing entity 22 that the object 12-1 is moving too quickly inward and the predicted stopping power of the expected viscosity versus shear rate of the STF 42 of the head unit, even when boosted, will not be enough to slow the object 12-1 to a desired velocity or position. When informed that one head unit, even with a modified viscosity, is not enough to control the object 12-1, the control module 30 determines how many other head units (e.g., connected via the head unit connector 112) to apply and to dynamically modify the viscosity.

In yet another alternative embodiment, the computing entity 22 issues a series of system messages 162 to a set of computing entities associated with a corresponding set of head units to produce a cascading effect of altering of the viscosity of the STF 42 of each of the chambers 16 associated with the set of head units. For example, 3 head units are controlled by 3 corresponding computing entities to adjust viscosity in a time cascaded manner. For instance, head unit 10-1 abruptly changes the viscosity to attempt to slow the object 12-1 followed seconds later by head unit 10-2 abruptly changing the viscosity to attempt to further slow the object 12-1, followed seconds later by head unit 12-3 abruptly changing the viscosity to attempt to further slow the object 12-1.

In a still further alternative embodiment, the computing entity 22 conditionally issues each message of the series of system messages 162 to the set of computing entities associated with the corresponding set of head units to produce the cascading effect of altering of the viscosity of the STF 42 of each of the chambers 16 associated with the set of head units only when a most recent adaptation of viscosity is not enough to slow the object 12-1 with desired results. For example, the 3 head units are controlled by the 3 corresponding computing entities to adjust viscosity in a conditional time cascaded manner. For instance, head unit 10-1 abruptly changes the viscosity to attempt to slow the object 12-1 followed seconds later by head unit 10-2 abruptly changing the viscosity if head unit 10-1 was unsuccessful to attempt to further slow the object 12-1, followed seconds later by head unit 12-3 abruptly changing the viscosity if head unit 10-2 was unsuccessful to attempt to further slow the object 12-1.

Figure 1B:
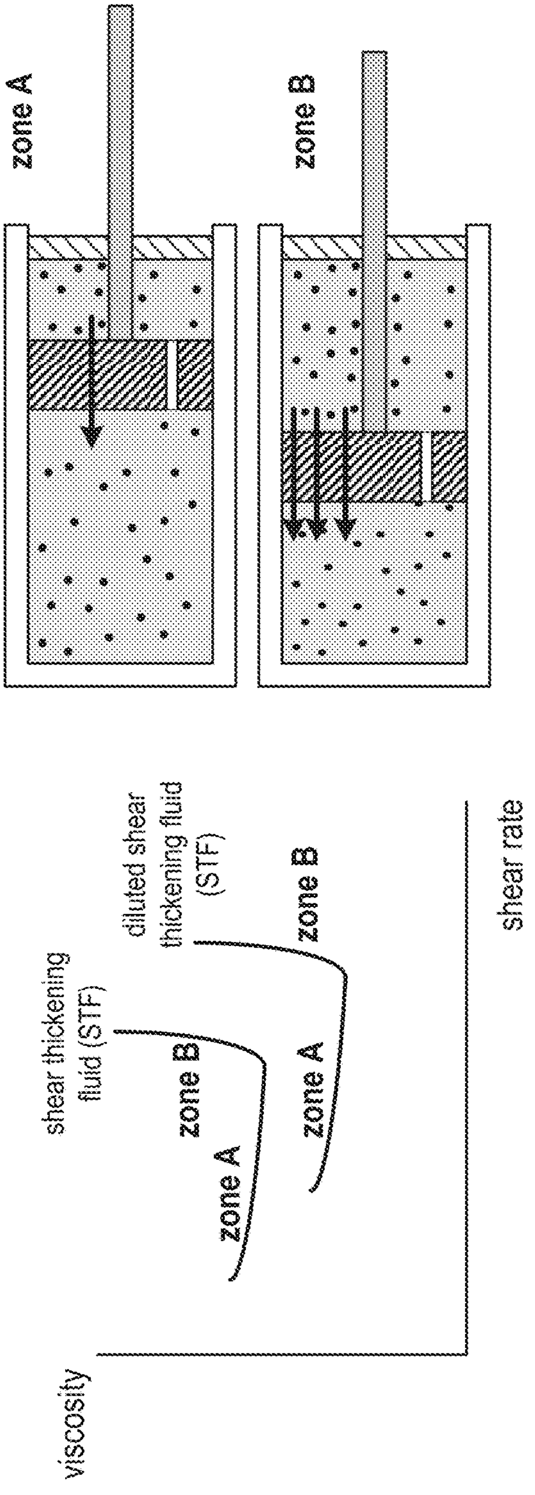
FIG. 1B is a graph of viscosity vs. shear rate for an aspect of an embodiment of a mechanical and computing system in accordance with the present invention.

FIG. 1B is a graph of viscosity vs. shear rate for an aspect of an embodiment of a mechanical and computing system that includes a chamber, a shear thickening fluid, and a piston that moves through the chamber applying forces on the shear thickening fluid. The shear thickening fluid includes a non-Newtonian fluid since the relationship between shear rate and viscosity is nonlinear.

A relationship between compressive impulse (e.g., shear rate) and the viscosity of the shear thickening fluid is nonlinear and may comprise one or more inflection points as the piston travels within the chamber in response to different magnitudes of forces and different accelerations. The viscosity of the STF may also be a function of other influences, such as electric fields, acoustical waves, magnetic fields, and other similar influences. As a first example of a response of a shear thickening fluid, a first range of shear rates in zone A has a decreasing viscosity as the shear rate increases and then in a second range of shear rates in zone B the viscosity increases abruptly. As a second example of a response of a diluted shear thickening fluid, the first range of shear rates in zone A extends to a higher level of shear rates with the decreasing viscosity and then in the still higher second range of shear rates in zone B the viscosity increases abruptly similar to that of the shear thickening include.

The shear thickening fluid includes particles within a solvent. Examples of particles of the shear thickening fluid include oxides, calcium carbonate, synthetically occurring minerals, naturally occurring minerals, polymers, or a mixture thereof. Further examples of the particles of the shear thickening fluid include SiO2, polystyrene, or polymethylmethacrylate.

The particles are suspended in a solvent. Example components of the solvent include water, a salt, a surfactant, and a polymer. Further example components of the solvent include ethylene glycol, polyethylene glycol, ethanol, silicon oils, phenyltrimethicone or a mixture thereof. Example particle diameters range from less than 100 μm to less than 1 millimeter. In an instance, the shear thickening fluid is made of silica particles suspended in polyethylene glycol at a volume fraction of approximately 0.57 with the silica particles having an average particle diameter of approximately 446 nm. As a result, the shear thickening fluid exhibits a shear thickening transition at a shear rate of approximately 102-103 s−1.

A volume fraction of particles dispersed within the solvent distinguishes the viscosity versus shear rate of different shear thickening fluids. The viscosity of the STF changes in response to the applied shear stress. At rest and under weak applied shear stress, a STF may have a fairly constant or even slightly decreasing viscosity because the random distribution of particles causes the particles to frequently collide. However, as a greater shear stress is applied so that the shear rate increases, the particles flow in a more streamlined manner. However, as an even greater shear stress is applied so that the shear rate increases further, a hydrodynamic coupling between the particles may overcome the interparticle forces responsible for Brownian motion. The particles may be driven closer together, and the microstructure of the colloidal dispersion may change, so that particles cluster together in hydroclusters.

The viscosity curve of the STF can be fine-tuned through changes in the characteristics of the particles suspended in the solvent. For example, the particles shape, surface chemistry, ionic strength, and size affect the various interparticle forces involved, as does the properties of the solvent. However, in general, hydrodynamic forces dominate at a high shear stress, which also makes the addition of a polymer attached to the particle surface effective in limiting clumping in hydroclusters. Various factors influence this clumping behavior, including, fluid slip, adsorbed ions, surfactants, polymers, surface roughness, graft density (e.g., of a grafted polymer), molecular weight, and solvent, so that the onset of shear thickening can be modified. In general, the onset of shear thickening can be slowed by the introduction of techniques to prevent the clumping of particles. For example, influencing the STF with emissions from an emitter in proximal location to the chamber.

Figure 1C:
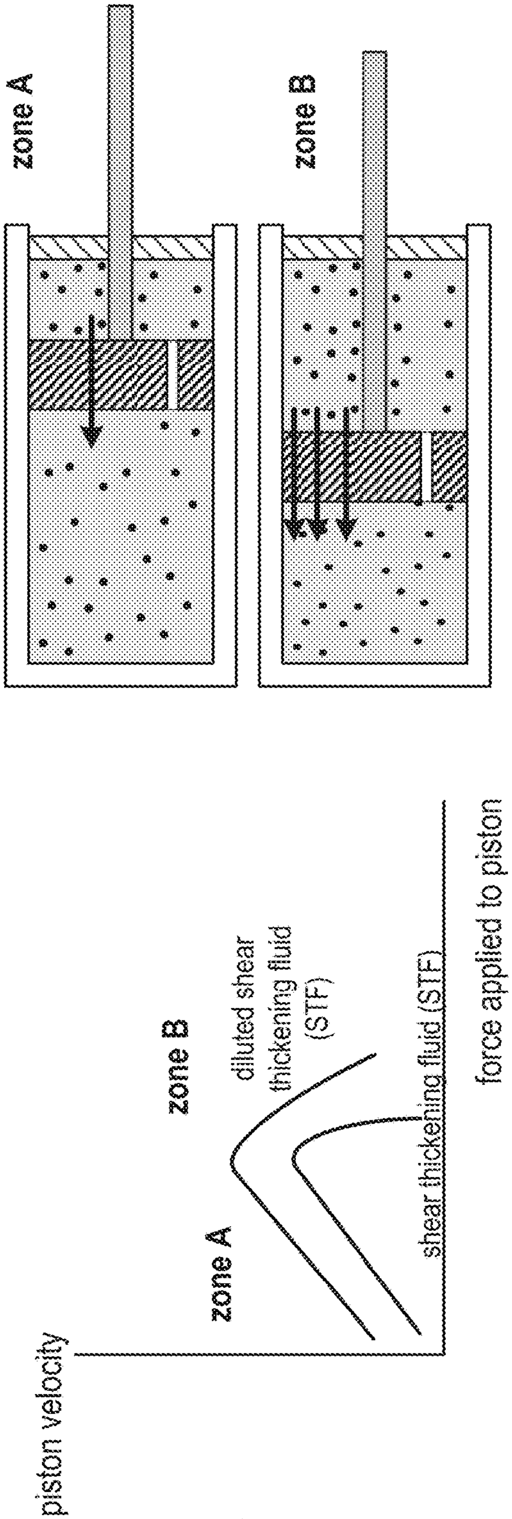
FIG. 1C is a graph of plunger velocity vs. force applied to the plunger for an aspect of an embodiment of a mechanical and computing system in accordance with the present invention.

FIG. 1C is a graph of piston velocity vs. force applied to the piston for an aspect of an embodiment of a mechanical and computing system that includes a chamber, a shear thickening fluid, and a piston that moves through the chamber applying forces on the shear thickening fluid. The shear thickening fluid includes a non-Newtonian fluid since the relationship between shear rate and viscosity is nonlinear.

An example curve for a shear thickening fluid indicates that as more force is applied to the piston in zone A, a higher piston velocity is realized until the corresponding transition to zone B occurs where the shear threshold affect takes hold and the viscosity abruptly increases significantly. When the viscosity increases abruptly, the piston velocity slows back down and may even stop.

Another example curve for a diluted shear thickening fluid indicates that as more force is applied to the piston in zone A, an even higher piston velocity is realized until the corresponding transition to zone B occurs where the shear threshold affect takes hold and the viscosity abruptly increases significantly. When the viscosity increases abruptly, the piston velocity slows back down and may even stop.

Figure 2A:
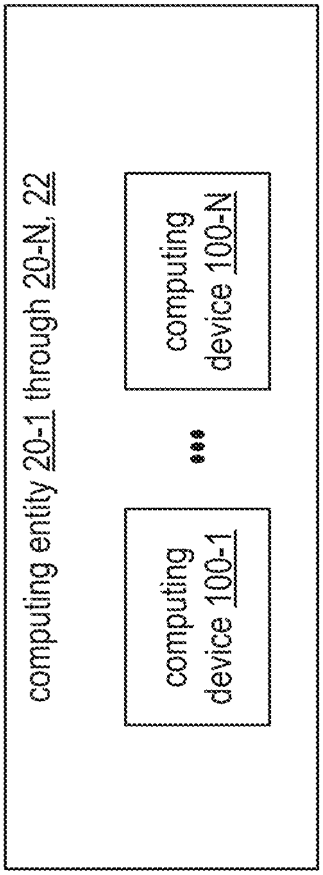
FIG. 2A is a schematic block diagram of an embodiment of a computing entity of a computing system in accordance with the present invention.

FIG. 2A is a schematic block diagram of an embodiment of the computing entity (e.g., 20-1 through 20-N; and 22) of the mechanical and computing system of FIG. 1. The computing entity includes one or more computing devices 100-1 through 100-N. A computing device is any electronic device that communicates data, processes data, represents data (e.g., user interface) and/or stores data.

Computing devices include portable computing devices and fixed computing devices. Examples of portable computing devices include an embedded controller, a smart sensor, a social networking device, a gaming device, a smart phone, a laptop computer, a tablet computer, a video game controller, and/or any other portable device that includes a computing core. Examples of fixed computing devices includes a personal computer, a computer server, a cable set-top box, a fixed display device, an appliance, and industrial controller, a video game counsel, a home entertainment controller, a critical infrastructure controller, and/or any type of home, office or cloud computing equipment that includes a computing core.

Figure 2B:
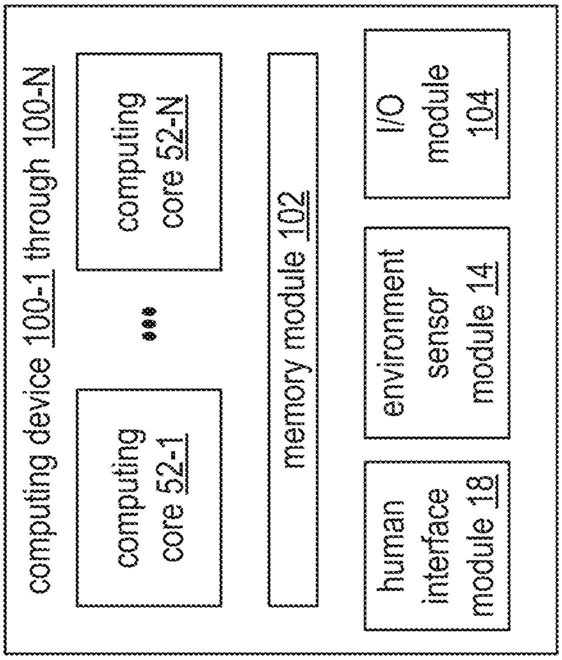
FIG. 2B is a schematic block diagram of an embodiment of a computing device of a computing system in accordance with the present invention.

FIG. 2B is a schematic block diagram of an embodiment of a computing device (e.g., 100-1 through 100-N) of the computing entity of FIG. 2A that includes one or more computing cores 52-1 through 52-N, a memory module 102, a human interface module 18, an environment sensor module 14, and an input/output (I/O) module 104. In alternative embodiments, the human interface module 18, the environment sensor module 14, the I/O module 104, and the memory module 102 may be standalone (e.g., external to the computing device). An embodiment of the computing device is discussed in greater detail with reference to FIG. 3.

Figure 3:
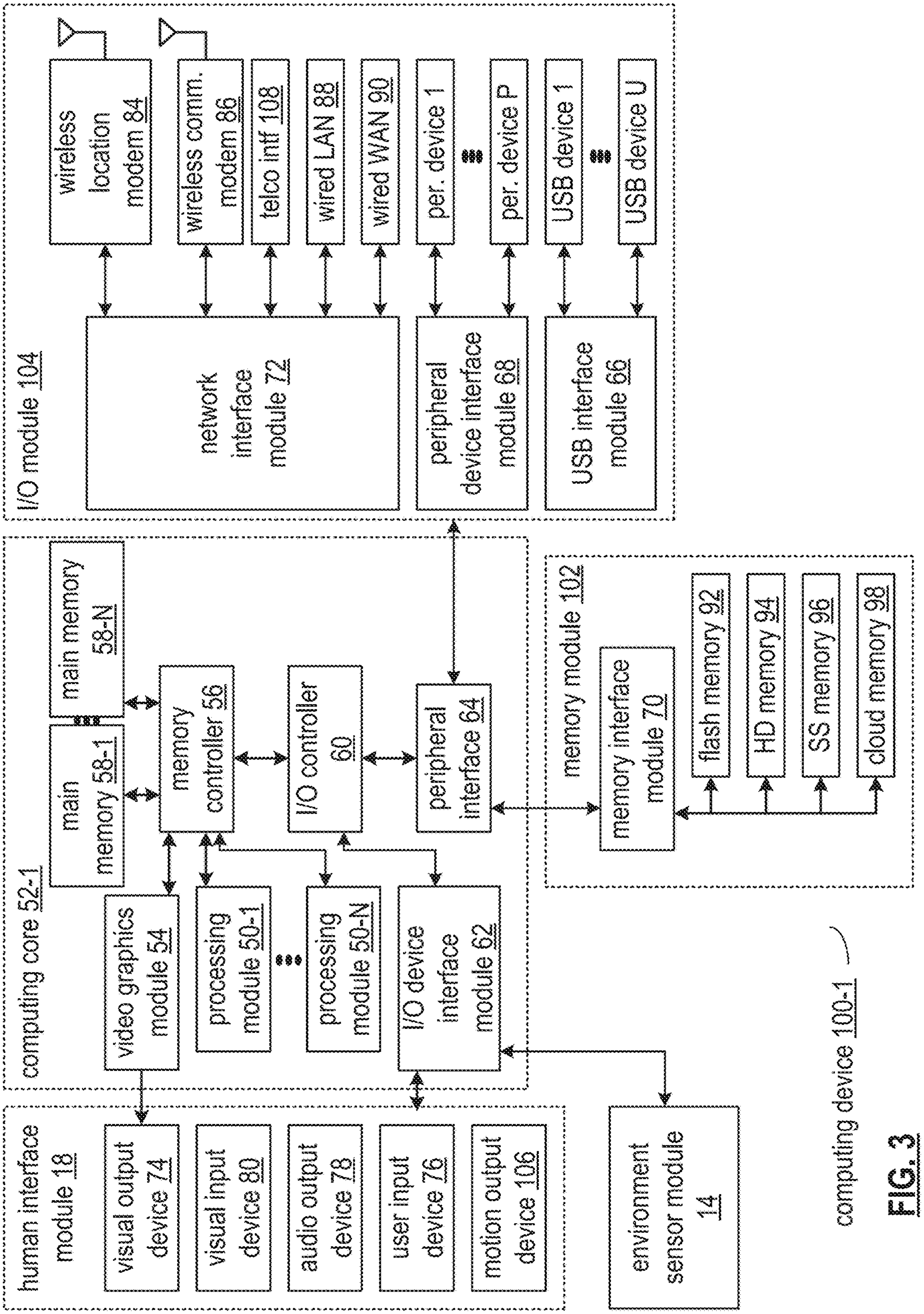
FIG. 3 is a schematic block diagram of another embodiment of a computing device of a computing system in accordance with the present invention.

FIG. 3 is a schematic block diagram of another embodiment of the computing device 100-1 of the mechanical and computing system of FIG. 1 that includes the human interface module 18, the environment sensor module 14, the computing core 52-1, the memory module 102, and the I/O module 104. The human interface module 18 includes one or more visual output devices 74 (e.g., video graphics display, 3-D viewer, touchscreen, LED, etc.), one or more visual input devices 80 (e.g., a still image camera, a video camera, a 3-D video camera, photocell, etc.), and one or more audio output devices 78 (e.g., speaker(s), headphone jack, a motor, etc.). The human interface module 18 further includes one or more user input devices 76 (e.g., keypad, keyboard, touchscreen, voice to text, a push button, a microphone, a card reader, a door position switch, a biometric input device, etc.) and one or more motion output devices 106 (e.g., servos, motors, lifts, pumps, actuators, anything to get real-world objects to move).

The computing core 52-1 includes a video graphics module 54, one or more processing modules 50-1 through 50-N, a memory controller 56, one or more main memories 58-1 through 58-N (e.g., RAM), one or more input/output (I/O) device interface modules 62, an input/output (I/O) controller 60, and a peripheral interface 64. A processing module is as defined at the end of the detailed description.

The memory module 102 includes a memory interface module 70 and one or more memory devices, including flash memory devices 92, hard drive (HD) memory 94, solid state (SS) memory 96, and cloud memory 98. The cloud memory 98 includes an on-line storage system and an on-line backup system.

The I/O module 104 includes a network interface module 72, a peripheral device interface module 68, and a universal serial bus (USB) interface module 66. Each of the I/O device interface module 62, the peripheral interface 64, the memory interface module 70, the network interface module 72, the peripheral device interface module 68, and the USB interface modules 66 includes a combination of hardware (e.g., connectors, wiring, etc.) and operational instructions stored on memory (e.g., driver software) that are executed by one or more of the processing modules 50-1 through 50-N and/or a processing circuit within the particular module.

The I/O module 104 further includes one or more wireless location modems 84 (e.g., global positioning satellite (GPS), Wi-Fi, angle of arrival, time difference of arrival, signal strength, dedicated wireless location, etc.) and one or more wireless communication modems 86 (e.g., a cellular network transceiver, a wireless data network transceiver, a Wi-Fi transceiver, a Bluetooth transceiver, a 315 MHz transceiver, a zig bee transceiver, a 60 GHz transceiver, etc.). The I/O module 104 further includes a telco interface 108 (e.g., to interface to a public switched telephone network), a wired local area network (LAN) 88 (e.g., optical, electrical), and a wired wide area network (WAN) 90 (e.g., optical, electrical). The I/O module 104 further includes one or more peripheral devices (e.g., peripheral devices 1-P) and one or more universal serial bus (USB) devices (USB devices 1-U). In other embodiments, the computing device 100-1 may include more or less devices and modules than shown in this example embodiment.

Figure 4:
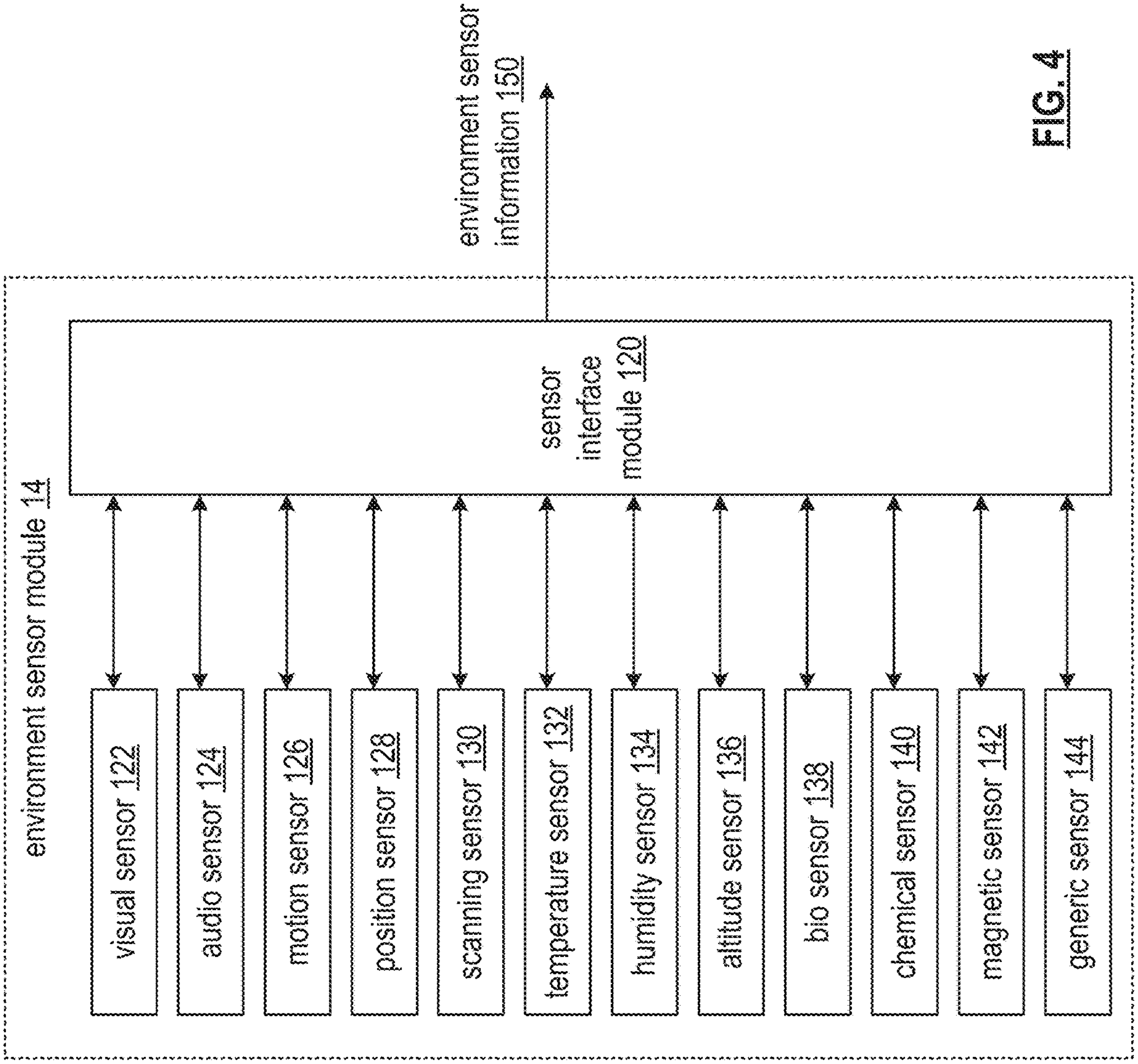
FIG. 4 is a schematic block diagram of an embodiment of an environment sensor module of a computing system in accordance with the present invention.

FIG. 4 is a schematic block diagram of an embodiment of the environment sensor module 14 of the computing device of FIG. 2B that includes a sensor interface module 120 to output environment sensor information 150 based on information communicated with a set of sensors. The set of sensors includes a visual sensor 122 (e.g., to the camera, 3-D camera, 360° view camera, a camera array, an optical spectrometer, etc.) and an audio sensor 124 (e.g., a microphone, a microphone array). The set of sensors further includes a motion sensor 126 (e.g., a solid-state Gyro, a vibration detector, a laser motion detector) and a position sensor 128 (e.g., a Hall effect sensor, an image detector, a GPS receiver, a radar system).

The set of sensors further includes a scanning sensor 130 (e.g., CAT scan, MRI, x-ray, ultrasound, radio scatter, particle detector, laser measure, further radar) and a temperature sensor 132 (e.g., thermometer, thermal coupler). The set of sensors further includes a humidity sensor 134 (resistance based, capacitance based) and an altitude sensor 136 (e.g., pressure based, GPS-based, laser-based).

The set of sensors further includes a biosensor 138 (e.g., enzyme, microbial) and a chemical sensor 140 (e.g., mass spectrometer, gas, polymer). The set of sensors further includes a magnetic sensor 142 (e.g., Hall effect, piezo electric, coil, magnetic tunnel junction) and any generic sensor 144 (e.g., including a hybrid combination of two or more of the other sensors).

Figure 5A:
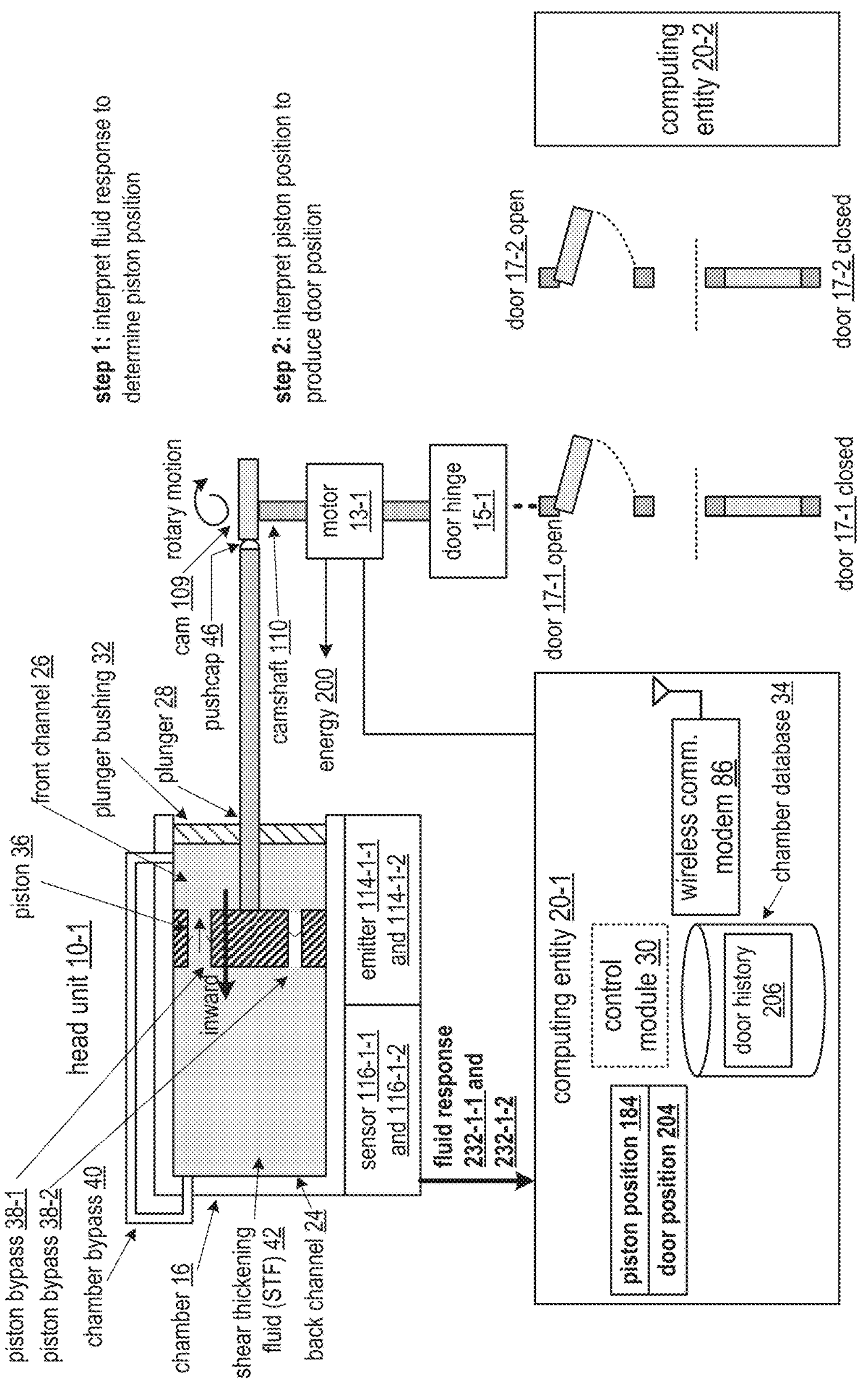
FIGS. 5A-5B are schematic block diagrams of another embodiment of a mechanical and computing system illustrating an example of controlling operational aspects in accordance with the present invention.
Figure 5B:
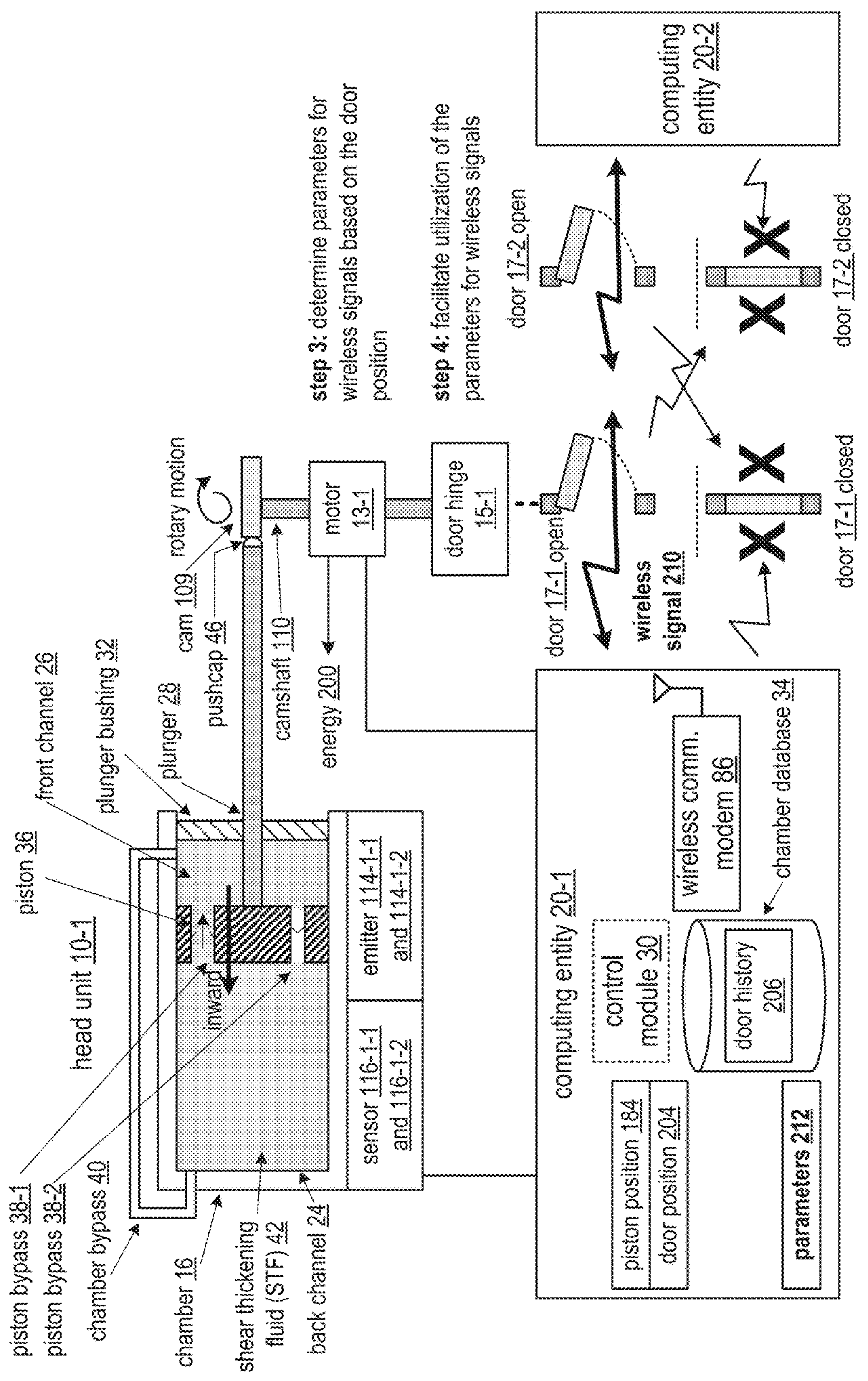

FIGS. 5A-5B are schematic block diagrams of another embodiment of a mechanical and computing system illustrating an example of controlling operational aspects. The mechanical and computing system includes a head unit system that includes the head unit 10-1 of FIG. 1A, an electric motor 13-1, a door hinge 15-1 coupled to a door 17-1, and the computing entity 20-1 of FIG. 1A. The head unit system further includes a rotary-motion-to-linear-motion conversion device (e.g., camshaft 110 of FIG. 1A coupled to the cam 109 of FIG. 1A) configured to convert rotary motion of the camshaft to linear motion of the piston 36 via the plunger 28 and pushcap 46.

The camshaft 110 further couples the motor 13-1 and the door hinge 15-1. The motor is configured to provide one or more of propulsion of the camshaft in a rotary fashion, position control of the camshaft, and energy harvested from the rotary motion of the camshaft when propelled by another entity (e.g., from the door via the hinge). Implementations of the electric motor 13-1 include at least one of an electronic lock, an electric motor only, a servo motor, and a regeneration motor/generator.

In an embodiment, the head unit system further includes the computing entity 20-2 of FIG. 1 and another door 17-2. The computing entity 20-1 includes the control module 30 of FIG. 1A, the chamber database 34 FIG. 1A, and the wireless communication modems 86 of FIG. 3.

The head unit 10-1 includes a shear thickening fluid (STF) 42. The STF is configured to have a decreasing viscosity in response to a first range of shear rates and an increasing viscosity in response to a second range of shear rates as discussed with reference to FIG. 1B. The second range of shear rates are greater than the first range of shear rates.

The head unit further includes a chamber 16. The chamber is configured to contain a portion of the STF and includes a front channel 26 and a back channel 24.

The head unit further includes a piston 36 housed at least partially radially within the chamber 16 and separating the back channel 24 and the front channel 26. The piston is configured to exert pressure against the shear thickening fluid in response to movement of the piston from a force applied to the piston via the plunger 28. The movement of the piston includes one of traveling through the chamber in an inward direction or traveling through the chamber in an outward direction. The piston travels toward the back channel and away from the front channel when traveling in the inward direction. The piston travels toward the front channel and away from the back channel when traveling in the outward direction.

The piston 36 includes a first piston bypass 38-1 between opposite sides of the piston that controls flow of the STF 42 between the opposite sides of the piston from the back channel to the front channel when the piston is traveling through the chamber in the inward direction to cause the STF to react with a first shear threshold effect.

The piston 36 further includes a second piston bypass 38-2 between the opposite sides of the piston that controls flow of the STF between the opposite sides of the piston from the front channel to the back channel when the piston is traveling through the chamber in the outward direction to cause the STF to react with a second shear threshold effect.

The head unit 10-1 further includes a set of fluid flow sensors 116-1-1 and 116-1-2 positioned proximal to the chamber 16. The set of fluid flow sensors provide the fluid response 232-1-1 and 232-1-2 respectively from the STF 42.

The head unit 10-1 further includes a set of fluid manipulation emitters 114-1-1 and 114-1-2 positioned proximal to the chamber 16. The set of fluid manipulation emitters provide a fluid activation to at least one of the STF 42 (e.g., shifting the shear rate versus viscosity curve), the first piston bypass 38-1 (e.g., to block or allow flow of the STF), the electric motor 13-1, and the second piston bypass 38-2 to control the motion of the object 12-1.

FIG. 5A illustrates an example of operation of a method for the controlling the operational aspects. A first step of the example of operation includes the piston 36 moving inward towards the head unit 10-1 when the cam 109 exerts the force on the plunger 28 from a rotary motion of the camshaft 110 from the door hinge 15-1 in response to motion of the door 17-1 that transfers the force to the piston 36. As a result, the piston 36 exerts the force on the STF 42 within the back channel 24.

The first step of the example of operation further includes the computing entity 20-1 interpreting a fluid response from the set of fluid flow sensors to produce a piston position 184 of the piston 36 associated with a head unit device of a head unit system. The set of fluid flow sensors are positioned proximal to the head unit device for controlling motion of the piston 36 and hence door 17-1. For example, the computing entity 20-1 interprets fluid responses 232-1-1 and 232-1-2 from the STF 42 in response to varying responsiveness of particles of the STF to produce the piston position. Alternatively, or in addition to, the computing entity 20-1 interprets the fluid responses to produce a piston velocity and a shear force metric of the STF.

The interpreting the fluid response from the set of fluid flow sensors to produce the piston position of the piston includes a series of sub-steps. A first sub-step includes inputting, from one or more fluid flow sensors of the set of fluid flow sensors, a set of fluid flow signals over a time range. For example, the computing entity 20-1 receives fluid responses 232-1-1 and 232-1-2 over the time range, where the fluid responses include the fluid flow signals.

A second sub-step includes determining the fluid flow response of the set of fluid flow sensors based on the set of fluid flow signals. For example, the computing entity 20-1 interprets the fluid flow signals to produce the fluid flow response.

A third sub-step includes determining a piston velocity based on the fluid flow response of the set of fluid flow sensors over the time range. For example, the computing entity 20-1 calculates piston velocity based on changes in the fluid flow response over the time range.

A fourth sub-step includes determining the piston position based on the piston velocity and a real-time reference. For example, the computing entity 20-1 calculates the piston position based on time in the piston velocity as the piston moves through the chamber.

As yet another example of interpreting the fluid response 232-1-1 and 232-1-2, the computing entity 20-1 compares the fluid response 232-1-1 and 232-1-2 to previous measurements of fluid flow versus piston velocity and piston position to produce the piston velocity and piston position 184. As a still further example of the interpreting the fluid response 232-1-1 and 232-1-2, the computing entity 20-1 extracts the piston velocity and the piston position 184 directly from the fluid response 232-1-1 and/or 232-1-2 when the sensors 116-1-1 and 116-1-2 generate the piston velocity and piston position directly.

In an embodiment, the first step of the example of operation further includes the computing entity 20-1 determining a shear force based on the piston velocity and the piston position 184. The determining the shear force based on the piston velocity and the piston position includes one approach of a variety of approaches. A first approach includes extracting the shear force directly from the fluid flow response when one or more fluid flow sensors of the set of fluid flow sensors outputs a shear force encoded signal. For example, the computing entity 20-1 extracts the shear force directly from the fluid responses 232-1-1 and 232-1-2. In an instance, the shear force reveals the piston velocity versus force applied to the piston curve.

A second approach includes determining the shear force utilizing the piston velocity and stored data for piston velocity versus shear force for the STF. For example, the computing entity 20-1 compares the velocity and position to stored data for instantaneous velocity and position versus shear force for the STF 42.

A third approach includes determining the shear force utilizing the piston position and stored data for piston position and a piston bypass versus shear force for the STF within the chamber. For example, the computing entity 20-1 compares the velocity and position to stored data for instantaneous velocity and position versus shear force for the STF 42 based on an actual valve opening status of the first piston bypass 38-1 (e.g., which allows flow of the STF from the back channel 24 to the front channel 26 when the piston is moving in the inward direction of the example).

Having produced the piston position 184, a second step of the example of operation includes the computing entity 20-1 interpreting the piston position to produce a door position of the door. The door position indicates at least one of location of a sliding door, location of a swinging door, percentage open, percentage closed, percentage of hinge range, or any other metric to describe physical positioning of the door. Producing of the door position includes a variety of approaches. A first approach includes interpreting mapping data recovered from the chamber database 34 based on the piston position 184 to produce the door position 204. For example, the computing entity 20-1 maps piston position to door position utilizing the mapping data recovered from the chamber database 34.

A second approach includes performing a wireless communication test utilizing the wireless communication modem to produce a communication viability result (e.g., viable, not viable). For example, the computing entity 20-1 sends wireless signals between the computing entity 20-1 and the computing entity 20-2 to verify that the door 17-1 is open enough to allow successful communication of wireless signals through a door opening associated with the door 17-1 and perhaps other doors.

A third approach includes updating the door position to include the communication viability result. For example, the computing entity 20-1 updates the door position to include the "viable" viability result when the wireless communication test is favorable.

FIG. 5B further illustrates the example of operation, where having produced the door position, a third step includes the computing entity 20-1 determining parameters 212 for wireless signals 210 based on the door position 204. Wireless communication modem 86 associated with the head unit system communicates the wireless signals 210 with a second wireless modem associated with another computing device (e.g., the computing entity 20-2). The parameters 212 includes one or more of transmission power level, frequency, error coding approach, a retransmission approach, a desired signal level, a desired communication reliability level, unicast versus multicast approach, identification of the second wireless modem, and wireless path information for a wireless path between the wireless communication modems 86 and the second wireless modem (e.g., how many doors inline in the wireless path, which doors in the wireless path).

The determining of the parameters 212 for the wireless signals 210 includes a variety of approaches. A first approach includes recovering the parameters from the chamber database 34 based on the door position. A second approach includes performing a series of wireless communication tests between the wireless communication modem 86 and the second wireless modem in accordance with default parameters for wireless signals to update the default parameters for wireless signals to produce the parameters for wireless signals. For example, the computing entity 20-1 selects parameters to promote successful communication of information via the wireless signals 210 for the current door position 204.

A third approach includes selecting the parameters 212 based on status information about a set of doors associated with a wireless path traversed by the wireless signals between the wireless communication modem and the second wireless communication modem. The set of doors includes the door. For example, the computing entity 20-1 selects a frequency that is compatible with materials of the doors to penetrate the doors when the doors cannot be opened, selects a frequency that is compatible to minimize power consumption when transmitting the wireless signals through door openings when the doors are open or can be opened.

Having determined the parameters 212 for the wireless signals 210, a fourth step of the example method of operation includes the computing entity 20-1 facilitating utilization of the parameters for the wireless signals 210 to promote successful communication of status and/or control of the head unit system via the wireless signals 210. The utilization of the parameters includes a variety of approaches. A first approach includes programming the wireless communication modems 86 with various aspects associated with the parameters 212 for the wireless signal (e.g., frequency band, retransmission approach, etc.).

A second approach includes facilitating opening or closing one or more doors of a set of doors associated with a wireless path traversed by the wireless signals between the wireless communication modem 86 and the second wireless communication modem to achieve at least one of a threshold wireless signal level (e.g., a minimum signal level, a maximum signal level, a wireless signal level range) and a threshold wireless communication reliability level (e.g., a minimum wireless communication reliability level, a wireless communication reliability level, a wireless communication reliability level range). The desired wireless signal level may encompass opening the door to provide a higher signal level of desired signal from the wireless communication modem 86 to the second wireless modem. The desired wireless signal may further encompass closing the door to curtail an undesired signal level (e.g., interference on channel) from the wireless communication modem 86 to a third wireless communication modem.

The method described above in conjunction with a processing module of any computing entity of the mechanical and computing system of FIG. 1 can alternatively be performed by other modules of the system of FIG. 1 or by other devices. In addition, at least one memory section that is non-transitory (e.g., a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing entities of the computing system 10, cause one or more computing devices of the mechanical and computing system of FIG. 1 to perform any or all of the method steps described above.

Figure 6A:
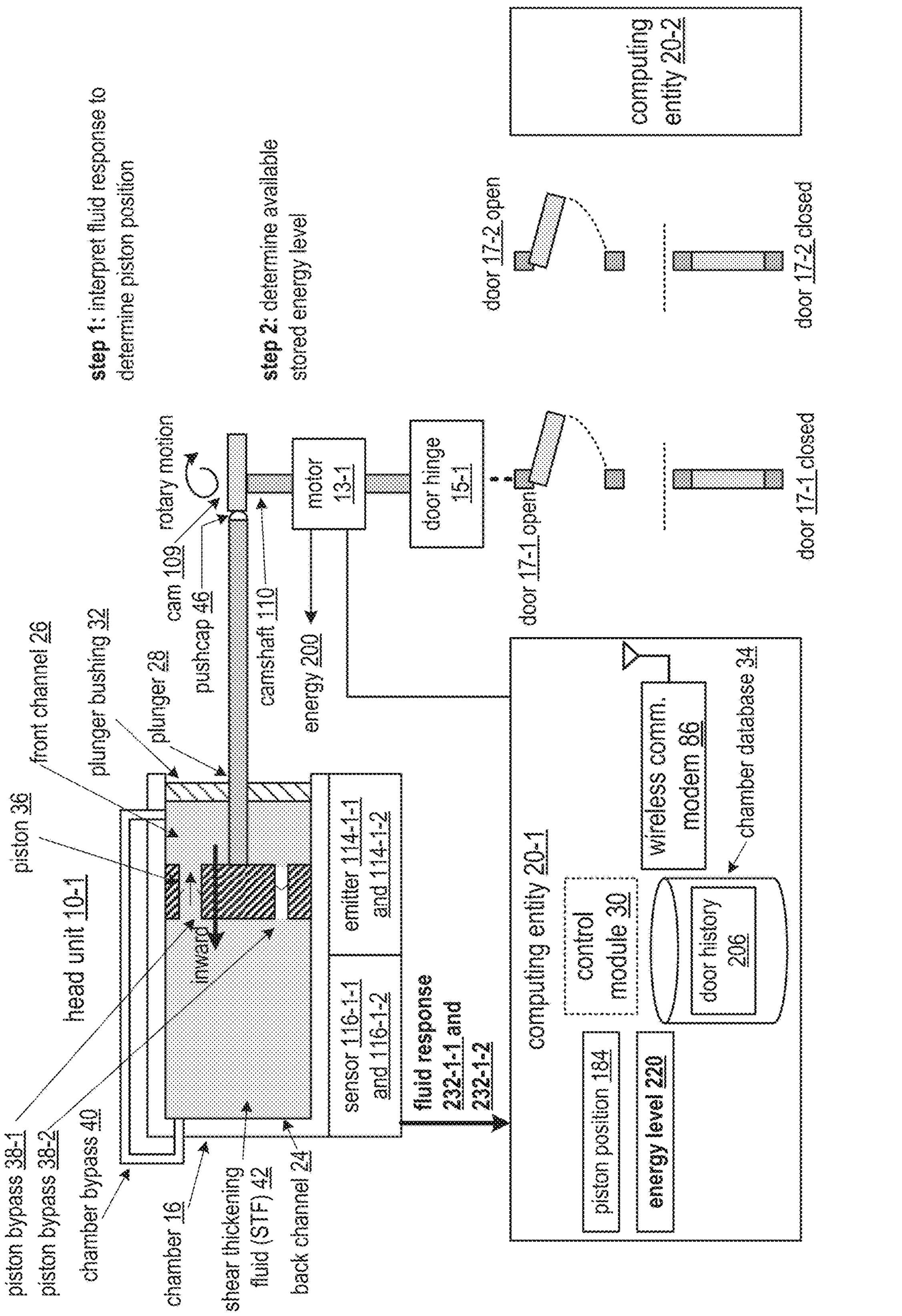
FIGS. 6A-6B are schematic block diagrams of another embodiment of a mechanical and computing system illustrating another example of controlling operational aspects in accordance with the present invention.
Figure 6B:
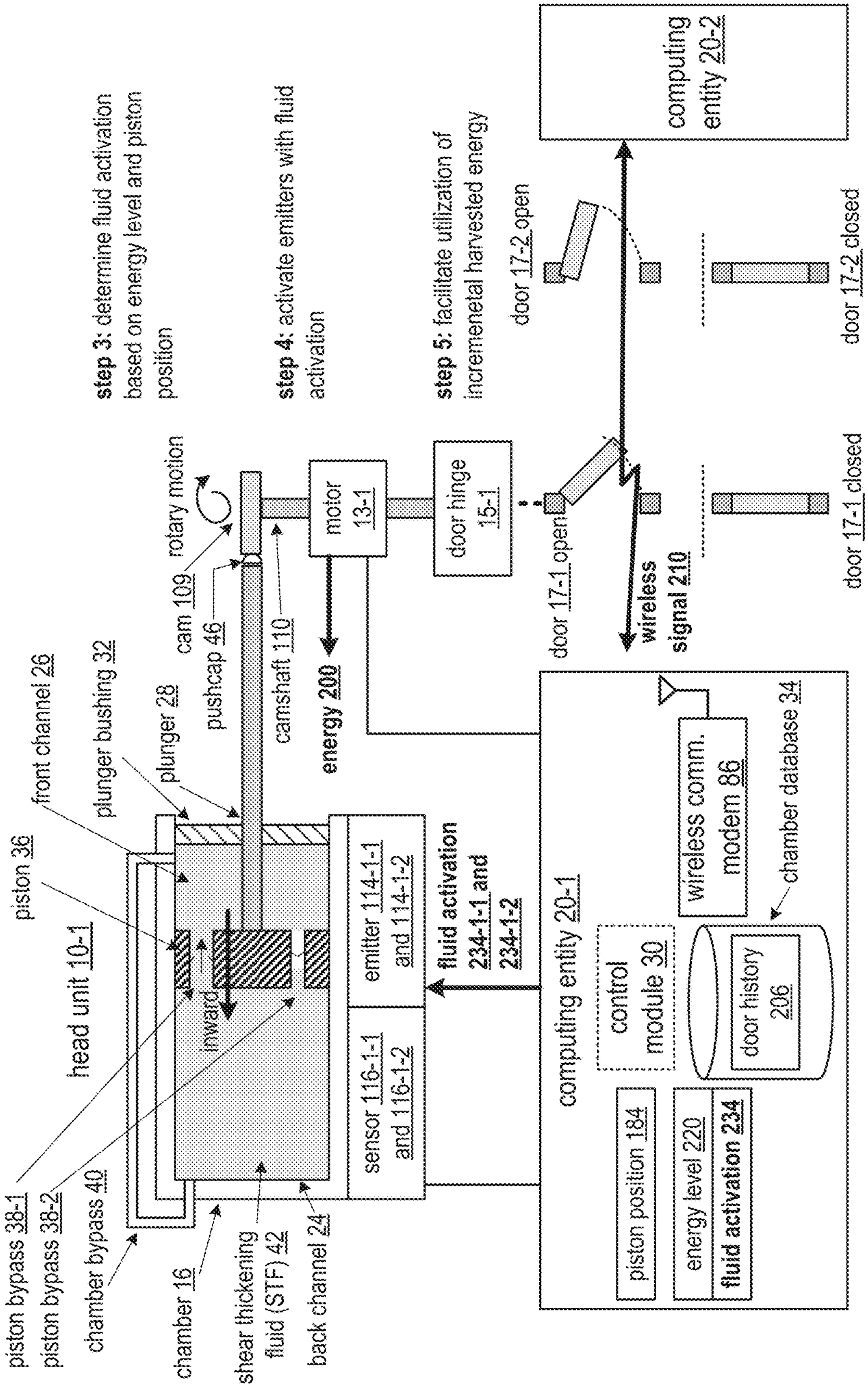

FIGS. 6A-6B are schematic block diagrams of another embodiment of a mechanical and computing system illustrating an example of controlling operational aspects. The mechanical and computing system includes a head unit system that includes the head unit 10-1 of FIG. 1A, a motor 13-1, a door hinge 15-1 coupled to a door 17-1, and the computing entity 20-1 of FIG. 1A. The head unit system further includes a rotary-motion-to-linear-motion conversion device (e.g., camshaft 110 of FIG. 1A coupled to the cam 109 of FIG. 1A) configured to convert rotary motion of the camshaft to linear motion of the piston 36 via the plunger 28 and pushcap 46.

The camshaft 110 further couples the motor 13-1 and the door hinge 15-1. The motor is configured to provide one or more of propulsion of the camshaft in a rotary fashion, position control of the camshaft, and energy harvested from the rotary motion of the camshaft when propelled by another entity (e.g., from the door via the hinge). Implementations of the motor 13-1 include at least one of an electronic lock, an electric motor only, a servo motor, and a regeneration motor/generator.

In an embodiment, the head unit system further includes the computing entity 20-2 of FIG. 1 and another door 17-2. The computing entity 20-1 includes the control module 30 of FIG. 1A, the chamber database 34 FIG. 1A, and the wireless communication modems 86 of FIG. 3.

The head unit 10-1 includes a shear thickening fluid (STF) 42. The STF is configured to have a decreasing viscosity in response to a first range of shear rates and an increasing viscosity in response to a second range of shear rates as discussed with reference to FIG. 1B. The second range of shear rates are greater than the first range of shear rates.

The head unit further includes a chamber 16. The chamber is configured to contain a portion of the STF and includes a front channel 26 and a back channel 24.

The head unit further includes a piston 36 housed at least partially radially within the chamber 16 and separating the back channel 24 and the front channel 26. The piston is configured to exert pressure against the shear thickening fluid in response to movement of the piston from a force applied to the piston via the plunger 28. The movement of the piston includes one of traveling through the chamber in an inward direction or traveling through the chamber in an outward direction. The piston travels toward the back channel and away from the front channel when traveling in the inward direction. The piston travels toward the front channel and away from the back channel when traveling in the outward direction.

The piston 36 includes a first piston bypass 38-1 between opposite sides of the piston that controls flow of the STF 42 between the opposite sides of the piston from the back channel to the front channel when the piston is traveling through the chamber in the inward direction to cause the STF to react with a first shear threshold effect.

The piston 36 further includes a second piston bypass 38-2 between the opposite sides of the piston that controls flow of the STF between the opposite sides of the piston from the front channel to the back channel when the piston is traveling through the chamber in the outward direction to cause the STF to react with a second shear threshold effect.

The head unit 10-1 further includes a set of fluid flow sensors 116-1-1 and 116-1-2 positioned proximal to the chamber 16. The set of fluid flow sensors provide the fluid response 232-1-1 and 232-1-2 respectively from the STF 42.

The head unit 10-1 further includes a set of fluid manipulation emitters 114-1-1 and 114-1-2 positioned proximal to the chamber 16. The set of fluid manipulation emitters provide a fluid activation to at least one of the STF 42 (e.g., shifting the shear rate versus viscosity curve), the first piston bypass 38-1 (e.g., to block or allow flow of the STF), and the second piston bypass 38-2 to control the motion of the object 12-1.

FIG. 6A illustrates an example of operation of a method for the controlling the operational aspects. A first step of the example of operation includes the piston 36 moving inward towards the head unit 10-1 when the cam 109 exerts the force on the plunger 28 from a rotary motion of the camshaft 110 from the door hinge 15-1 in response to motion of the door 17-1 that transfers the force to the piston 36. As a result, the piston 36 exerts the force on the STF 42 within the back channel 24.

The first step of the example of operation further includes the computing entity 20-1 interpreting a fluid response from the set of fluid flow sensors to produce a piston position 184 of the piston 36 associated with a head unit device of a head unit system. The set of fluid flow sensors are positioned proximal to the head unit device for controlling motion of the piston 36 and hence door 17-1. For example, the computing entity 20-1 interprets fluid responses 232-1-1 and 232-1-2 from the STF 42 in response to varying responsiveness of particles of the STF to produce the piston position. Alternatively, or in addition to, the computing entity 20-1 interprets the fluid responses to produce a piston velocity and a shear force metric of the STF.

The interpreting the fluid response from the set of fluid flow sensors to produce the piston position of the piston includes a series of sub-steps. A first sub-step includes inputting, from one or more fluid flow sensors of the set of fluid flow sensors, a set of fluid flow signals over a time range. For example, the computing entity 20-1 receives fluid responses 232-1-1 and 232-1-2 over the time range, where the fluid responses include the fluid flow signals.

A second sub-step includes determining the fluid flow response of the set of fluid flow sensors based on the set of fluid flow signals. For example, the computing entity 20-1 interprets the fluid flow signals to produce the fluid flow response.

A third sub-step includes determining the piston velocity based on the fluid flow response of the set of fluid flow sensors over the time range. For example, the computing entity 20-1 calculates piston velocity based on changes in the fluid flow response over the time range.

A fourth sub-step includes determining the piston position based on the piston velocity and a real-time reference. For example, the computing entity 20-1 calculates the piston position based on time in the piston velocity as the piston moves through the chamber.

As yet another example of interpreting the fluid response 232-1-1 and 232-1-2, the computing entity 20-1 compares the fluid response 232-1-1 and 232-1-2 to previous measurements of fluid flow versus piston velocity and piston position to produce the piston velocity and piston position 184. As a still further example of the interpreting the fluid response 232-1-1 and 232-1-2, the computing entity 20-1 extracts the piston velocity and the piston position 184 directly from the fluid response 232-1-1 and/or 232-1-2 when the sensors 116-1-1 and 116-1-2 generate the piston velocity and piston position directly.

The first step of the example of operation further includes the computing entity 20-1 determining a shear force based on the piston velocity and the piston position 184. The determining the shear force based on the piston velocity and the piston position includes one approach of a variety of approaches. A first approach includes extracting the shear force directly from the fluid flow response when one or more fluid flow sensors of the set of fluid flow sensors outputs a shear force encoded signal. For example, the computing entity 20-1 extracts the shear force directly from the fluid responses 232-1-1 and 232-1-2. In an instance, the shear force reveals the piston velocity versus force applied to the piston curve.

A second approach includes determining the shear force utilizing the piston velocity and stored data for piston velocity versus shear force for the STF. For example, the computing entity 20-1 compares the velocity and position to stored data for instantaneous velocity and position versus shear force for the STF 42.

A third approach includes determining the shear force utilizing the piston position and stored data for piston position and a piston bypass versus shear force for the STF within the chamber. For example, the computing entity 20-1 compares the velocity and position to stored data for instantaneous velocity and position versus shear force for the STF 42 based on an actual valve opening status of the first piston bypass 38-1 (e.g., which allows flow of the STF from the back channel 24 to the front channel 26 when the piston is moving in the inward direction of the example).

Having produced the piston position 184, when the motor 13-1 is configured to provide the energy harvested from the rotary motion of the camshaft when propelled by the door, a second step of the example of operation includes the computing entity 20-1 determining an available stored energy level 220 for the head unit system. The motor 13-1 provides energy 200 to the head unit system (e.g., temporarily stored in an energy storage device such as a battery and/or capacitor). The determining of the available stored energy level 220 includes the control module 30 accessing a sensor associated with the energy storage device to obtain energy storage metrics. The control module 30 interprets the energy storage metrics to produce the available stored energy level 220.

FIG. 6B further illustrates the example of operation, where having produced the available stored energy level 220, a third step includes the computing entity 20-1 determining a fluid activation 234 for the head unit device based on the available stored energy level 220 and the piston position 184. Generally, the fluid activation is selected to affect a desired impact on a future available stored energy level. For example, determine a fluid activation that promotes more energy being harvested and stored when the available stored energy level is less than a minimum threshold level. As another example, determine another fluid activation that promotes less energy being harvested and stored when the available stored energy level is greater than a maximum threshold level.

In particular, the computing entity 20-1 determines the fluid activation to adjust the viscosity of the STF to facilitate movement of the piston and hence door in a more desirable fashion for energy harvesting based on the available stored energy. The determining the fluid activation includes a variety of approaches. A first approach includes opening of either of the piston bypass 38-1 and piston bypass 38-2 allow the STF to move between the back channel 24 and the front channel 26 to lower the shear rate and thus select a lower viscosity which in turn allows more rapid movement of the piston in the chamber and hence speeds up the motor 13-1 harvest more energy sooner. A second approach includes opening of the chamber bypass 40 to lower the viscosity the STF. A third approach includes activating the set of emitters to directly alter the viscosity of the STF in a desired fashion (e.g., lowering viscosity to speed up opening or closing of the door, raising viscosity to slow down the opening or the closing of the door to slow down energy harvesting).

A fourth step of the example method of operation includes the computing entity 20-1 activating the set of fluid manipulation emitters 114-1-1 and 114-1-2 in accordance with the fluid activation 234 to manipulate one of the first shear threshold effect associated with the first piston bypass 38-1 and the second shear threshold effect associated with the second piston bypass 38-2 to control the energy harvested from the rotary motion of the camshaft. For example, when the door is closing when moving in the inward direction, the computing entity 20-1 outputs the fluid activation 234-1-1 to the piston bypass 38-1 to facilitate further opening of a one-way check valve to allow more of the STF to move from the back channel 24 to the front channel 26 thusly selecting the first range of shear rates and a lower viscosity of the STF to speed up the door to close and harvest more energy sooner.

As another example, when the door is closing (e.g., piston moving in the inward direction), the computing entity 20-1 outputs the fluid activation 234-1-1 to the piston bypass 38-1 to facilitate closing down the one-way check valve to prevent STF from moving from the back channel 24 to the front channel 26 thusly selecting the second range of shear rates and a higher viscosity the STF to slow down the door to slow down harvesting of further energy when the energy level is greater than the maximum threshold level.

Having activated the set of fluid manipulation emitters, a fifth step of the example method of operation includes the computing entity 20-1 facilitating storage of incremental energy harvested from the rotary motion of the camshaft when propelled by the door. For example, the motor 13-1 is configured to operate in a generator mode to provide the energy 200 to the energy storage device.

The fifth step further includes the computing entity 20-1 facilitating utilization of the incremental energy for an energy-consuming task of the head unit system. For example, the computing entity 20-1 facilitates communication of wireless signals to 10 between the wireless communication modems 86 and the second wireless modem of the computing entity 20-2.

The method described above in conjunction with a processing module of any computing entity of the mechanical and computing system of FIG. 1 can alternatively be performed by other modules of the system of FIG. 1 or by other devices. In addition, at least one memory section that is non-transitory (e.g., a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing entities of the computing system 10, cause one or more computing devices of the mechanical and computing system of FIG. 1 to perform any or all of the method steps described above.

Figure 7A:
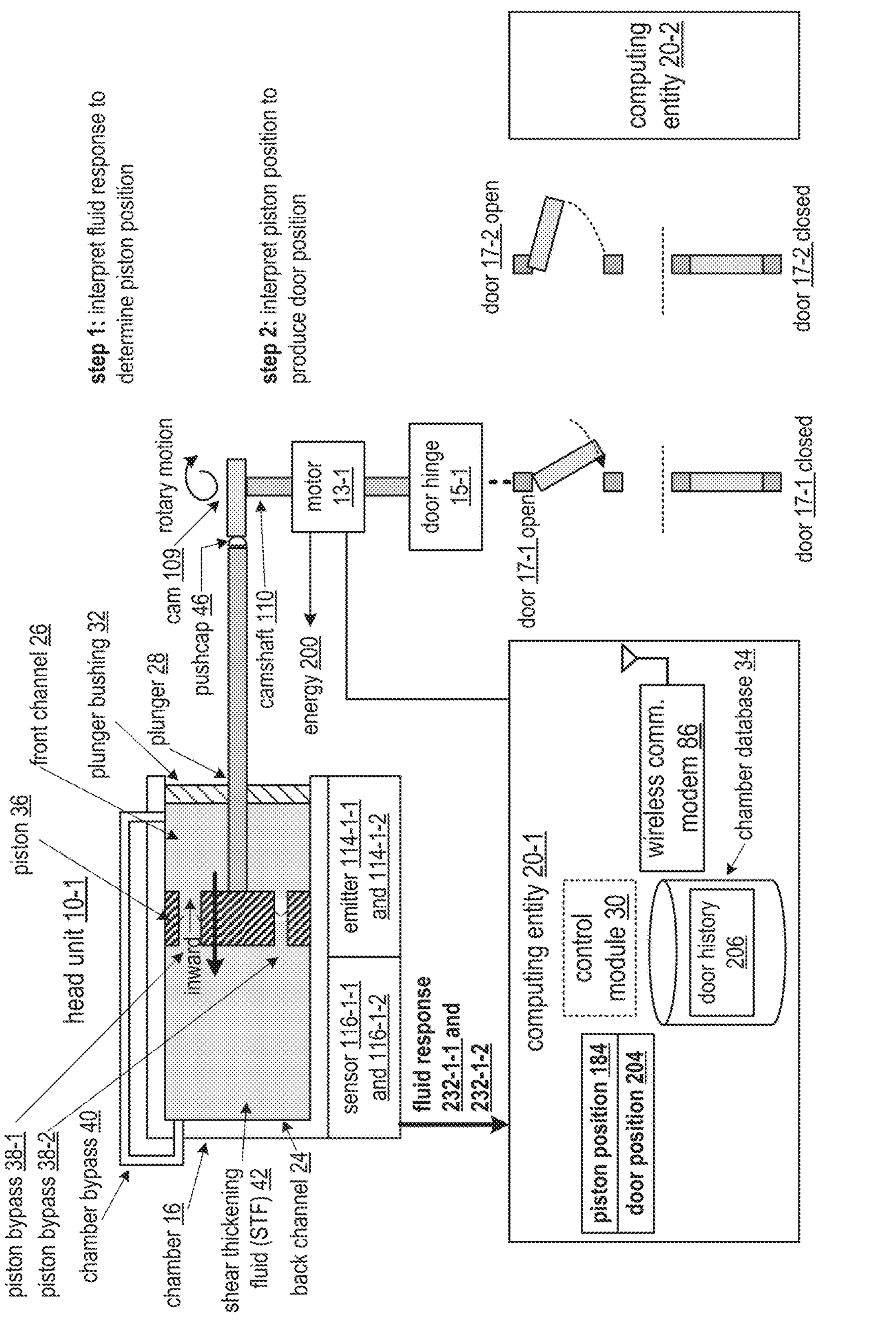
FIGS. 7A-7B are schematic block diagrams of another embodiment of a mechanical and computing system illustrating another example of controlling operational aspects in accordance with the present invention.
Figure 7B:
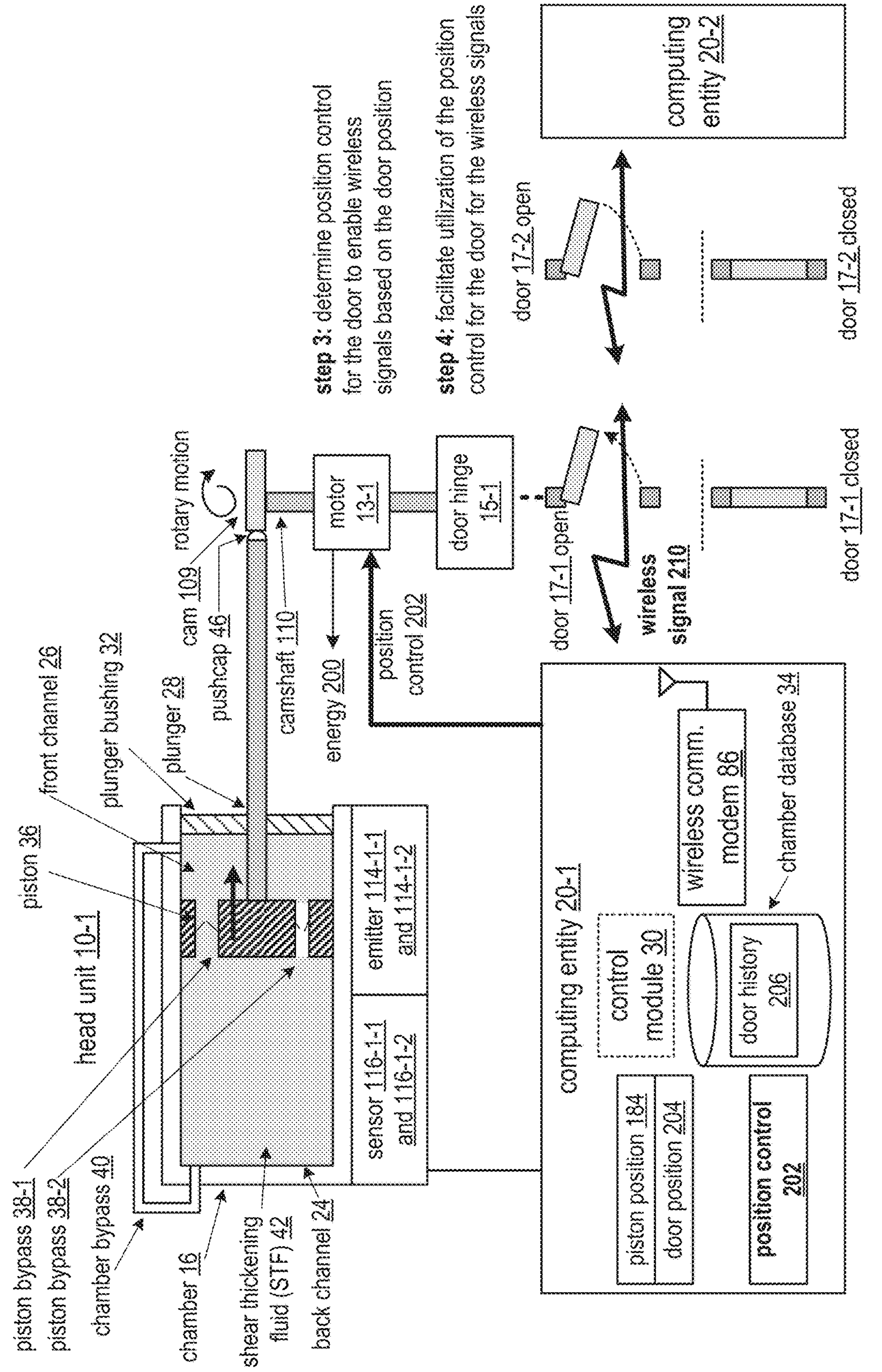

FIGS. 7A-7B are schematic block diagrams of another embodiment of a mechanical and computing system illustrating an example of controlling operational aspects. The mechanical and computing system includes a head unit system that includes the head unit 10-1 of FIG. 1A, a motor 13-1, a door hinge 15-1 coupled to a door 17-1, and the computing entity 20-1 of FIG. 1A. The head unit system further includes a rotary-motion-to-linear-motion conversion device (e.g., camshaft 110 of FIG. 1A coupled to the cam 109 of FIG. 1A) configured to convert rotary motion of the camshaft to linear motion of the piston 36 via the plunger 28 and pushcap 46.

The camshaft 110 further couples the motor 13-1 and the door hinge 15-1. The motor is configured to provide one or more of propulsion of the camshaft in a rotary fashion, position control of the camshaft, and energy harvested from the rotary motion of the camshaft when propelled by another entity (e.g., from the door via the hinge). Implementations of the motor 13-1 include at least one of an electronic lock, an electric motor only, a servo motor, and a regeneration motor/generator.

In an embodiment, the head unit system further includes the computing entity 20-2 of FIG. 1 and another door 17-2. The computing entity 20-1 includes the control module 30 of FIG. 1A, the chamber database 34 FIG. 1A, and the wireless communication modems 86 of FIG. 3.

The head unit 10-1 includes a shear thickening fluid (STF) 42. The STF is configured to have a decreasing viscosity in response to a first range of shear rates and an increasing viscosity in response to a second range of shear rates as discussed with reference to FIG. 1B. The second range of shear rates are greater than the first range of shear rates.

The head unit further includes a chamber 16. The chamber is configured to contain a portion of the STF and includes a front channel 26 and a back channel 24.

The head unit further includes a piston 36 housed at least partially radially within the chamber 16 and separating the back channel 24 and the front channel 26. The piston is configured to exert pressure against the shear thickening fluid in response to movement of the piston from a force applied to the piston via the plunger 28. The movement of the piston includes one of traveling through the chamber in an inward direction or traveling through the chamber in an outward direction. The piston travels toward the back channel and away from the front channel when traveling in the inward direction. The piston travels toward the front channel and away from the back channel when traveling in the outward direction.

The piston 36 includes a first piston bypass 38-1 between opposite sides of the piston that controls flow of the STF 42 between the opposite sides of the piston from the back channel to the front channel when the piston is traveling through the chamber in the inward direction to cause the STF to react with a first shear threshold effect.

The piston 36 further includes a second piston bypass 38-2 between the opposite sides of the piston that controls flow of the STF between the opposite sides of the piston from the front channel to the back channel when the piston is traveling through the chamber in the outward direction to cause the STF to react with a second shear threshold effect.

The head unit 10-1 further includes a set of fluid flow sensors 116-1-1 and 116-1-2 positioned proximal to the chamber 16. The set of fluid flow sensors provide the fluid response 232-1-1 and 232-1-2 respectively from the STF 42.

The head unit 10-1 further includes a set of fluid manipulation emitters 114-1-1 and 114-1-2 positioned proximal to the chamber 16. The set of fluid manipulation emitters provide a fluid activation to at least one of the STF 42 (e.g., shifting the shear rate versus viscosity curve), the first piston bypass 38-1 (e.g., to block or allow flow of the STF), and the second piston bypass 38-2 to control the motion of the object 12-1.

FIG. 7A illustrates an example of operation of a method for the controlling the operational aspects. A first step of the example of operation includes the piston 36 moving inward towards the head unit 10-1 when the cam 109 exerts the force on the plunger 28 from a rotary motion of the camshaft 110 from the door hinge 15-1 in response to motion of the door 17-1 that transfers the force to the piston 36. As a result, the piston 36 exerts the force on the STF 42 within the back channel 24.

The first step of the example of operation further includes the computing entity 20-1 interpreting a fluid response from the set of fluid flow sensors to produce a piston position 184 of the piston 36 associated with a head unit device of a head unit system. The set of fluid flow sensors are positioned proximal to the head unit device for controlling motion of the piston 36 and hence door 17-1. For example, the computing entity 20-1 interprets fluid responses 232-1-1 and 232-1-2 from the STF 42 in response to varying responsiveness of particles of the STF to produce the piston position. Alternatively, or in addition to, the computing entity 20-1 interprets the fluid responses to produce a piston velocity and a shear force metric of the STF.

The interpreting the fluid response from the set of fluid flow sensors to produce the piston position of the piston includes a series of sub-steps. A first sub-step includes inputting, from one or more fluid flow sensors of the set of fluid flow sensors, a set of fluid flow signals over a time range. For example, the computing entity 20-1 receives fluid responses 232-1-1 and 232-1-2 over the time range, where the fluid responses include the fluid flow signals.

A second sub-step includes determining the fluid flow response of the set of fluid flow sensors based on the set of fluid flow signals. For example, the computing entity 20-1 interprets the fluid flow signals to produce the fluid flow response.

A third sub-step includes determining the piston velocity based on the fluid flow response of the set of fluid flow sensors over the time range. For example, the computing entity 20-1 calculates piston velocity based on changes in the fluid flow response over the time range.

A fourth sub-step includes determining the piston position based on the piston velocity and a real-time reference. For example, the computing entity 20-1 calculates the piston position based on time in the piston velocity as the piston moves through the chamber.

As yet another example of interpreting the fluid response 232-1-1 and 232-1-2, the computing entity 20-1 compares the fluid response 232-1-1 and 232-1-2 to previous measurements of fluid flow versus piston velocity and piston position to produce the piston velocity and piston position 184. As a still further example of the interpreting the fluid response 232-1-1 and 232-1-2, the computing entity 20-1 extracts the piston velocity and the piston position 184 directly from the fluid response 232-1-1 and/or 232-1-2 when the sensors 116-1-1 and 116-1-2 generate the piston velocity and piston position directly.

The first step of the example of operation further includes the computing entity 20-1 determining a shear force based on the piston velocity and the piston position 184. The determining the shear force based on the piston velocity and the piston position includes one approach of a variety of approaches. A first approach includes extracting the shear force directly from the fluid flow response when one or more fluid flow sensors of the set of fluid flow sensors outputs a shear force encoded signal. For example, the computing entity 20-1 extracts the shear force directly from the fluid responses 232-1-1 and 232-1-2. In an instance, the shear force reveals the piston velocity versus force applied to the piston curve.

A second approach includes determining the shear force utilizing the piston velocity and stored data for piston velocity versus shear force for the STF. For example, the computing entity 20-1 compares the velocity and position to stored data for instantaneous velocity and position versus shear force for the STF 42.

A third approach includes determining the shear force utilizing the piston position and stored data for piston position and a piston bypass versus shear force for the STF within the chamber. For example, the computing entity 20-1 compares the velocity and position to stored data for instantaneous velocity and position versus shear force for the STF 42 based on an actual valve opening status of the first piston bypass 38-1 (e.g., which allows flow of the STF from the back channel 24 to the front channel 26 when the piston is moving in the inward direction of the example).

Having produced the piston position 184, a second step of the example of operation includes the computing entity 20-1 interpreting the piston position to produce a door position of the door. The door position indicates at least one of location of a sliding door, location of a swinging door, percentage open, percentage closed, percentage of hinge range, or any other metric to describe physical positioning of the door. Producing of the door position includes a variety of approaches. A first approach includes mapping piston position to door position utilizing mapping data recovered from the chamber database 34. A second approach further includes verifying the door position by performing a wireless communication test utilizing the wireless communication modems 86 (e.g., sending wireless signals between the computing entity 20-1 and the computing entity 20-2 to verify that the door 17-1 is open enough to allow successful communication of wireless signals through a door opening associated with the door 17-1 and perhaps other doors.

FIG. 7B further illustrates the example of operation, where having produced the door position, a third step includes the computing entity 20-1 determining a position control 202 for the door 17-1 to enable wireless signals based on the door position 204. The wireless modem associated with the head unit system communicates the wireless signals 210 with a second wireless modem associated with another computing device (e.g., the computing entity 20-1 via openings of door 17-1 and 17-2). The determining the position control includes a variety of approaches. A first approach includes accessing door position mapping information (e.g., door history 206) from the chamber database 34, where the door position mapping information lists how far open the door 17-1 should be to facilitate successful communication of the wireless signals 210. For instance, the control module 30 determines to open the door 17-1 to a 50% opening level when the door position 204 is currently 30% and the door position mapping information indicates that the door must be at least 35% open to facilitate successful communications of the wireless signals 210.

A second approach includes the control module 30 facilitating a wireless communication test utilizing the wireless communication modem 86 to determine how to adjust the door opening of door 17-1. For instance, the control module 30 determines to open the door 17-1 to a 75% opening level when the door position 204 is currently 60% and the wireless communication test indicates that the wireless communication is underperforming (e.g., too many errors).

Having determined the position control for the door, a fourth step of the example method of operation includes the computing entity 20-1 facilitating utilization of the position control for the door for the wireless signals to promote successful communication of status and/or control of the head unit system via the wireless signals. For example, the control module 30 outputs the position control 202 to the motor 13-1 to facilitate the opening or the closing of the door in accordance with the position control 202. Having moved the door, the control module 30 activates the wireless communication modems 86 to communicate the wireless signals 210 to carry the status and/or control of the head unit system. For instance, the computing entity 20-1 communicates door history 206 with the computing entity 20-2 to facilitate optimization of multiple head unit systems.

The method described above in conjunction with a processing module of any computing entity of the mechanical and computing system of FIG. 1 can alternatively be performed by other modules of the system of FIG. 1 or by other devices. In addition, at least one memory section that is non-transitory (e.g., a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing entities of the computing system 10, cause one or more computing devices of the mechanical and computing system of FIG. 1 to perform any or all of the method steps described above.

FIGS. 8A-8B are schematic block diagrams of another embodiment of a mechanical and computing system illustrating an example of controlling operational aspects. The mechanical and computing system includes a head unit system that includes the head unit 10-1 of FIG. 1A, a motor 13-1, a door hinge 15-1 coupled to a door 17-1, and the computing entity 20-1 of FIG. 1A. The head unit system further includes a rotary-motion-to-linear-motion conversion device (e.g., camshaft 110 of FIG. 1A coupled to the cam 109 of FIG. 1A) configured to convert rotary motion of the camshaft to linear motion of the piston 36 via the plunger 28 and pushcap 46.

The camshaft 110 further couples the motor 13-1 and the door hinge 15-1. The motor is configured to provide one or more of propulsion of the camshaft in a rotary fashion, position control of the camshaft, and energy harvested from the rotary motion of the camshaft when propelled by another entity (e.g., from the door via the hinge). Implementations of the motor 13-1 include at least one of an electronic lock, an electric motor only, a servo motor, and a regeneration motor/generator.

In an embodiment, the head unit system further includes the computing entity 20-2 of FIG. 1 and another door 17-2. The computing entity 20-1 includes the control module 30 of FIG. 1A, the chamber database 34 FIG. 1A, and the wireless communication modems 86 of FIG. 3.

The head unit 10-1 includes a shear thickening fluid (STF) 42. The STF is configured to have a decreasing viscosity in response to a first range of shear rates and an increasing viscosity in response to a second range of shear rates as discussed with reference to FIG. 1B. The second range of shear rates are greater than the first range of shear rates.

The head unit further includes a chamber 16. The chamber is configured to contain a portion of the STF and includes a front channel 26 and a back channel 24.

The head unit further includes a piston 36 housed at least partially radially within the chamber 16 and separating the back channel 24 and the front channel 26. The piston is configured to exert pressure against the shear thickening fluid in response to movement of the piston from a force applied to the piston via the plunger 28. The movement of the piston includes one of traveling through the chamber in an inward direction or traveling through the chamber in an outward direction. The piston travels toward the back channel and away from the front channel when traveling in the inward direction. The piston travels toward the front channel and away from the back channel when traveling in the outward direction.

The piston 36 includes a first piston bypass 38-1 between opposite sides of the piston that controls flow of the STF 42 between the opposite sides of the piston from the back channel to the front channel when the piston is traveling through the chamber in the inward direction to cause the STF to react with a first shear threshold effect.

The piston 36 further includes a second piston bypass 38-2 between the opposite sides of the piston that controls flow of the STF between the opposite sides of the piston from the front channel to the back channel when the piston is traveling through the chamber in the outward direction to cause the STF to react with a second shear threshold effect.

The head unit 10-1 further includes a set of fluid flow sensors 116-1-1 and 116-1-2 positioned proximal to the chamber 16. The set of fluid flow sensors provide the fluid response 232-1-1 and 232-1-2 respectively from the STF 42.

The head unit 10-1 further includes a set of fluid manipulation emitters 114-1-1 and 114-1-2 positioned proximal to the chamber 16. The set of fluid manipulation emitters provide a fluid activation to at least one of the STF 42 (e.g., shifting the shear rate versus viscosity curve), the first piston bypass 38-1 (e.g., to block or allow flow of the STF), and the second piston bypass 38-2 to control the motion of the object 12-1.

FIG. 8A illustrates an example of operation of a method for the controlling the operational aspects. A first step of the example of operation includes the piston 36 moving inward towards the head unit 10-1 when the cam 109 exerts the force on the plunger 28 from a rotary motion of the camshaft 110 from the door hinge 15-1 in response to motion of the door 17-1 that transfers the force to the piston 36. As a result, the piston 36 exerts the force on the STF 42 within the back channel 24.

The first step of the example of operation further includes the computing entity 20-1 interpreting a fluid response from the set of fluid flow sensors to produce a piston position 184 of the piston 36 associated with a head unit device of a head unit system. The set of fluid flow sensors are positioned proximal to the head unit device for controlling motion of the piston 36 and hence door 17-1. For example, the computing entity 20-1 interprets fluid responses 232-1-1 and 232-1-2 from the STF 42 in response to varying responsiveness of particles of the STF to produce the piston position. Alternatively, or in addition to, the computing entity 20-1 interprets the fluid responses to produce a piston velocity and a shear force metric of the STF.

The interpreting the fluid response from the set of fluid flow sensors to produce the piston position of the piston includes a series of sub-steps. A first sub-step includes inputting, from one or more fluid flow sensors of the set of fluid flow sensors, a set of fluid flow signals over a time range. For example, the computing entity 20-1 receives fluid responses 232-1-1 and 232-1-2 over the time range, where the fluid responses include the fluid flow signals.

A second sub-step includes determining the fluid flow response of the set of fluid flow sensors based on the set of fluid flow signals. For example, the computing entity 20-1 interprets the fluid flow signals to produce the fluid flow response.

A third sub-step includes determining the piston velocity based on the fluid flow response of the set of fluid flow sensors over the time range. For example, the computing entity 20-1 calculates piston velocity based on changes in the fluid flow response over the time range.

A fourth sub-step includes determining the piston position based on the piston velocity and a real-time reference. For example, the computing entity 20-1 calculates the piston position based on time in the piston velocity as the piston moves through the chamber.

As yet another example of interpreting the fluid response 232-1-1 and 232-1-2, the computing entity 20-1 compares the fluid response 232-1-1 and 232-1-2 to previous measurements of fluid flow versus piston velocity and piston position to produce the piston velocity and piston position 184. As a still further example of the interpreting the fluid response 232-1-1 and 232-1-2, the computing entity 20-1 extracts the piston velocity and the piston position 184 directly from the fluid response 232-1-1 and/or 232-1-2 when the sensors 116-1-1 and 116-1-2 generate the piston velocity and piston position directly.

The first step of the example of operation further includes the computing entity 20-1 determining a shear force based on the piston velocity and the piston position 184. The determining the shear force based on the piston velocity and the piston position includes one approach of a variety of approaches. A first approach includes extracting the shear force directly from the fluid flow response when one or more fluid flow sensors of the set of fluid flow sensors outputs a shear force encoded signal. For example, the computing entity 20-1 extracts the shear force directly from the fluid responses 232-1-1 and 232-1-2. In an instance, the shear force reveals the piston velocity versus force applied to the piston curve.

A second approach includes determining the shear force utilizing the piston velocity and stored data for piston velocity versus shear force for the STF. For example, the computing entity 20-1 compares the velocity and position to stored data for instantaneous velocity and position versus shear force for the STF 42.

A third approach includes determining the shear force utilizing the piston position and stored data for piston position and a piston bypass versus shear force for the STF within the chamber. For example, the computing entity 20-1 compares the velocity and position to stored data for instantaneous velocity and position versus shear force for the STF 42 based on an actual valve opening status of the first piston bypass 38-1 (e.g., which allows flow of the STF from the back channel 24 to the front channel 26 when the piston is moving in the inward direction of the example).

Having produced the piston position 184, a second step of the example of operation includes the computing entity 20-1 interpreting the piston position to produce a door position of the door. The door position indicates at least one of location of a sliding door, location of a swinging door, percentage open, percentage closed, percentage of hinge range, or any other metric to describe physical positioning of the door. Producing of the door position includes a variety of approaches. A first approach includes mapping piston position to door position utilizing mapping data recovered from the chamber database 34. A second approach further includes verifying the door position by performing a wireless communication test utilizing the wireless communication modems 86 (e.g., sending wireless signals between the computing entity 20-1 and the computing entity 20-2 to verify that the door 17-1 is open enough to allow successful communication of wireless signals through a door opening associated with the door 17-1 and perhaps other doors.

FIG. 8B further illustrates the example of operation, where having produced the door position, a third step includes the computing entity 20-1 determining a position control for the door to enable a security mode based on the door position. The security mode includes at least one of keeping the door securely closed, keeping the door open in a fixed position to enable passing through of an object (e.g., a hotel towel) but not of a person, and keeping the door essentially fully open.

The determining of the position control includes a series of sub-steps. A first sub-step includes the computing entity 20-1 identifying the security mode. For example, the control module 30 interprets a wireless signal 210 from the computing entity 20-2 (e.g., a local controlling smart phone) to produce the security mode to keep the door open no more than 5 inches to allow pass-through of a hotel towel. As another example, the control module 30 interprets the door history 206 recovered from the chamber database 34 to determine a security mode based on a pattern of past security modes versus time of day and/or activity.

Having determined the security mode, the computing entity 20-1 determines the position control 202 based on the security mode. For example, the control module 30 extracts the position control 202 from the chamber database 34 based on the security mode. As another example, the control module 30 interprets a further wireless signal 210 to produce the position control 202.

Having produced the position control for the security mode, a fourth step of the example method of operation includes the computing entity 20-1 facilitating utilization of the position control for the door to support the security mode. For example, the control module 30 outputs the position control 202 to the motor 13-1 to move the door 17-1 from a current position of the door position 204 to a desired position in accordance with the security mode.

The method described above in conjunction with a processing module of any computing entity of the mechanical and computing system of FIG. 1 can alternatively be performed by other modules of the system of FIG. 1 or by other devices. In addition, at least one memory section that is non-transitory (e.g., a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing entities of the computing system 10, cause one or more computing devices of the mechanical and computing system of FIG. 1 to perform any or all of the method steps described above.

FIGS. 9A-9B are schematic block diagrams of another embodiment of a mechanical and computing system illustrating an example of controlling operational aspects. The mechanical and computing system includes a head unit system that includes the head unit 10-1 of FIG. 1A, a motor 13-1, a door hinge 15-1 coupled to a door 17-1, and the computing entity 20-1 of FIG. 1A. The head unit system further includes a rotary-motion-to-linear-motion conversion device (e.g., camshaft 110 of FIG. 1A coupled to the cam 109 of FIG. 1A) configured to convert rotary motion of the camshaft to linear motion of the piston 36 via the plunger 28 and pushcap 46.

The camshaft 110 further couples the motor 13-1 and the door hinge 15-1. The motor is configured to provide one or more of propulsion of the camshaft in a rotary fashion, position control of the camshaft, and energy harvested from the rotary motion of the camshaft when propelled by another entity (e.g., from the door via the hinge). Implementations of the motor 13-1 include at least one of an electronic lock, an electric motor only, a servo motor, and a regeneration motor/generator.

In an embodiment, the head unit system further includes the computing entity 20-2 of FIG. 1 and another door 17-2. The computing entity 20-1 includes the control module 30 of FIG. 1A, the chamber database 34 FIG. 1A, and the wireless communication modems 86 of FIG. 3.

The head unit 10-1 includes a shear thickening fluid (STF) 42. The STF is configured to have a decreasing viscosity in response to a first range of shear rates and an increasing viscosity in response to a second range of shear rates as discussed with reference to FIG. 1B. The second range of shear rates are greater than the first range of shear rates.

The head unit further includes a chamber 16. The chamber is configured to contain a portion of the STF and includes a front channel 26 and a back channel 24.

The head unit further includes a piston 36 housed at least partially radially within the chamber 16 and separating the back channel 24 and the front channel 26. The piston is configured to exert pressure against the shear thickening fluid in response to movement of the piston from a force applied to the piston via the plunger 28. The movement of the piston includes one of traveling through the chamber in an inward direction or traveling through the chamber in an outward direction. The piston travels toward the back channel and away from the front channel when traveling in the inward direction. The piston travels toward the front channel and away from the back channel when traveling in the outward direction.

The piston 36 includes a first piston bypass 38-1 between opposite sides of the piston that controls flow of the STF 42 between the opposite sides of the piston from the back channel to the front channel when the piston is traveling through the chamber in the inward direction to cause the STF to react with a first shear threshold effect.

The piston 36 further includes a second piston bypass 38-2 between the opposite sides of the piston that controls flow of the STF between the opposite sides of the piston from the front channel to the back channel when the piston is traveling through the chamber in the outward direction to cause the STF to react with a second shear threshold effect.

The head unit 10-1 further includes a set of fluid flow sensors 116-1-1 and 116-1-2 positioned proximal to the chamber 16. The set of fluid flow sensors provide the fluid response 232-1-1 and 232-1-2 respectively from the STF 42.

The head unit 10-1 further includes a set of fluid manipulation emitters 114-1-1 and 114-1-2 positioned proximal to the chamber 16. The set of fluid manipulation emitters provide a fluid activation to at least one of the STF 42 (e.g., shifting the shear rate versus viscosity curve), the first piston bypass 38-1 (e.g., to block or allow flow of the STF), and the second piston bypass 38-2 to control the motion of the object 12-1.

FIG. 9A illustrates an example of operation of a method for the controlling the operational aspects. A first step of the example of operation includes the piston 36 moving inward towards the head unit 10-1 when the cam 109 exerts the force on the plunger 28 from a rotary motion of the camshaft 110 from the door hinge 15-1 in response to motion of the door 17-1 that transfers the force to the piston 36. As a result, the piston 36 exerts the force on the STF 42 within the back channel 24.

The first step of the example of operation further includes the computing entity 20-1 interpreting a fluid response from the set of fluid flow sensors to produce a piston position 184 of the piston 36 associated with a head unit device of a head unit system. The set of fluid flow sensors are positioned proximal to the head unit device for controlling motion of the piston 36 and hence door 17-1. For example, the computing entity 20-1 interprets fluid responses 232-1-1 and 232-1-2 from the STF 42 in response to varying responsiveness of particles of the STF to produce the piston position. Alternatively, or in addition to, the computing entity 20-1 interprets the fluid responses to produce a piston velocity and a shear force metric of the STF.

The interpreting the fluid response from the set of fluid flow sensors to produce the piston position of the piston includes a series of sub-steps. A first sub-step includes inputting, from one or more fluid flow sensors of the set of fluid flow sensors, a set of fluid flow signals over a time range. For example, the computing entity 20-1 receives fluid responses 232-1-1 and 232-1-2 over the time range, where the fluid responses include the fluid flow signals.

A second sub-step includes determining the fluid flow response of the set of fluid flow sensors based on the set of fluid flow signals. For example, the computing entity 20-1 interprets the fluid flow signals to produce the fluid flow response.

A third sub-step includes determining the piston velocity based on the fluid flow response of the set of fluid flow sensors over the time range. For example, the computing entity 20-1 calculates piston velocity based on changes in the fluid flow response over the time range.

A fourth sub-step includes determining the piston position based on the piston velocity and a real-time reference. For example, the computing entity 20-1 calculates the piston position based on time in the piston velocity as the piston moves through the chamber.

As yet another example of interpreting the fluid response 232-1-1 and 232-1-2, the computing entity 20-1 compares the fluid response 232-1-1 and 232-1-2 to previous measurements of fluid flow versus piston velocity and piston position to produce the piston velocity and piston position 184. As a still further example of the interpreting the fluid response 232-1-1 and 232-1-2, the computing entity 20-1 extracts the piston velocity and the piston position 184 directly from the fluid response 232-1-1 and/or 232-1-2 when the sensors 116-1-1 and 116-1-2 generate the piston velocity and piston position directly.

The first step of the example of operation further includes the computing entity 20-1 determining a shear force based on the piston velocity and the piston position 184. The determining the shear force based on the piston velocity and the piston position includes one approach of a variety of approaches. A first approach includes extracting the shear force directly from the fluid flow response when one or more fluid flow sensors of the set of fluid flow sensors outputs a shear force encoded signal. For example, the computing entity 20-1 extracts the shear force directly from the fluid responses 232-1-1 and 232-1-2. In an instance, the shear force reveals the piston velocity versus force applied to the piston curve.

A second approach includes determining the shear force utilizing the piston velocity and stored data for piston velocity versus shear force for the STF. For example, the computing entity 20-1 compares the velocity and position to stored data for instantaneous velocity and position versus shear force for the STF 42.

A third approach includes determining the shear force utilizing the piston position and stored data for piston position and a piston bypass versus shear force for the STF within the chamber. For example, the computing entity 20-1 compares the velocity and position to stored data for instantaneous velocity and position versus shear force for the STF 42 based on an actual valve opening status of the first piston bypass 38-1 (e.g., which allows flow of the STF from the back channel 24 to the front channel 26 when the piston is moving in the inward direction of the example).

Having produced the piston position 184, a second step of the example of operation includes the computing entity 20-1 interpreting the piston position to produce a door position of the door. The door position indicates at least one of location of a sliding door, location of a swinging door, percentage open, percentage closed, percentage of hinge range, or any other metric to describe physical positioning of the door. Producing of the door position includes a variety of approaches. A first approach includes mapping piston position to door position utilizing mapping data recovered from the chamber database 34. A second approach further includes verifying the door position by performing a wireless communication test utilizing the wireless communication modems 86 (e.g., sending wireless signals between the computing entity 20-1 and the computing entity 20-2 to verify that the door 17-1 is open enough to allow successful communication of wireless signals through a door opening associated with the door 17-1 and perhaps other doors.

Having produced the door position 204, a third step of the example method of operation includes the computing entity 20-1 updating door position history based on the door position. The updating includes a variety of approaches. A first approach includes storing the door position as door position history 206 in the chamber database 34 from time to time. A second approach includes correlating the door position with an activity associated with utilization of the door 17-1 for storage as the door position history 206 (e.g., typical activities by time of day, exception activities, any activity that requires usage of the doorway and from time to time opening and closing of the door at least in part). A third approach includes logging all position control 202 of the motor 13-1 over time as part of the door position history 206. A fourth approach includes documenting the harvested energy 200 over time as part of the door position history 206. A fifth approach includes correlating and documenting metrics associated with wireless signals utilized by the wireless communication modems 86 based on the door position over time as part of the door position history 206.

FIG. 9B further illustrates the example method of operation, where having updated the door position history from time to time, a fourth step includes the computing entity 20-1 interpreting the door position history 206 to identify a potential of alertable issue 211. The alertable issue 211 includes at least one of sensing that the door has been left open longer than normal, sensing that the door has been closed longer than normal, sensing that the door has been open shorter than normal, sensing that the door has been closed shorter than normal, and sensing that the door has been utilized in an unusual way as compared to typical utilization for a particular activity (e.g., for cleaning a hotel room, for utilizing a hotel room for an overnight stay, for accessing a storage room for inventory, etc.).

The interpreting of the door position history includes a variety of approaches. A first approach includes detecting an anomaly by comparing a most recent utilization pattern of the door to a cumulative utilization pattern of the door for a similar activity and/or a similar time period of a similar day of the week. A second approach includes detecting the anomaly by comparing instantaneous door position to a particular historical door position. A third approach includes detecting the anomaly by comparing the most recent utilization pattern to a new historical pattern provided via a wireless communication message.

Having identified the anomaly, the computing entity 20-1 generates the alertable issue 211 to include a summary of the identified anomaly. Having produced the alertable issue 211, the computing entity 20-1 saves the alertable issue 211 in the chamber database 34 and/or sends the alertable issue 211 to another computing entity via the wireless communication modems 86.

The method described above in conjunction with a processing module of any computing entity of the mechanical and computing system of FIG. 1 can alternatively be performed by other modules of the system of FIG. 1 or by other devices. In addition, at least one memory section that is non-transitory (e.g., a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing entities of the computing system 10, cause one or more computing devices of the mechanical and computing system of FIG. 1 to perform any or all of the method steps described above.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules, and components herein, can be implemented as illustrated or by discrete components, application specific integrated circuits, processors executing appropriate software and the like or any combination thereof.

In addition, a flow diagram may include a “start” and/or “continue” indication. The “start” and “continue” indications reflect that the steps presented can optionally be incorporated in or otherwise used in conjunction with one or more other routines. In addition, a flow diagram may include an “end” and/or “continue” indication. The “end” and/or “continue” indications reflect that the steps presented can end as described and shown or optionally be incorporated in or otherwise used in conjunction with one or more other routines. In this context, “start” indicates the beginning of the first step presented and may be preceded by other activities not specifically shown. Further, the “continue” indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term “module” is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, a quantum register or other quantum memory and/or any other device that stores data in a non-transitory manner. Furthermore, the memory device may be in a form of a solid-state memory, a hard drive memory or other disk storage, cloud memory, thumb drive, server memory, computing device memory, and/or other non-transitory medium for storing data. The storage of data includes temporary storage (i.e., data is lost when power is removed from the memory element) and/or persistent storage (i.e., data is retained when power is removed from the memory element). As used herein, a transitory medium shall mean one or more of: (a) a wired or wireless medium for the transportation of data as a signal from one computing device to another computing device for temporary storage or persistent storage; (b) a wired or wireless medium for the transportation of data as a signal within a computing device from one element of the computing device to another element of the computing device for temporary storage or persistent storage; (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A head unit system for controlling motion of a door, comprising:

- a rotary-motion-to-linear-motion conversion device, wherein the rotary-motion-to-linear-motion conversion device is configured to convert rotary motion of a camshaft to linear motion of a piston of a head unit device of the head unit system;
- an electric motor coupled to the camshaft, wherein the electric motor is configured to provide one or more of propulsion of the camshaft in a rotary fashion, position control of the camshaft, and energy harvested from the rotary motion of the camshaft when propelled by another entity;
- a door hinge coupled to the camshaft and to the door, wherein the door hinge is configured to provide the rotary motion of the camshaft when propelled by the door; and
- the head unit device, wherein the head unit device includes:
  - shear thickening fluid (STF), wherein the STF is configured to have a decreasing viscosity in response to a first range of shear rates and an increasing viscosity in response to a second range of shear rates, wherein the second range of shear rates are greater than the first range of shear rates,
  - a chamber, the chamber configured to contain a portion of the STF, wherein the chamber includes a front channel and a back channel,
  - the piston housed at least partially radially within the chamber and separating the back channel and the front channel, the piston configured to exert pressure against the shear thickening fluid in response to movement of the piston from a force applied to the piston,
  - wherein the movement of the piston includes one of traveling through the chamber in an inward direction or traveling through the chamber in an outward direction, wherein the piston travels toward the back channel and away from the front channel when traveling in the inward direction, wherein the piston travels toward the front channel and away from the back channel when traveling in the outward direction, wherein the piston includes:
    - a first piston bypass between opposite sides of the piston that controls flow of the STF between the opposite sides of the piston from the back channel to the front channel when the piston is traveling through the chamber in the inward direction to cause the STF to react with a first shear threshold effect, and
    - a second piston bypass between the opposite sides of the piston that controls flow of the STF between the opposite sides of the piston from the front channel to the back channel when the piston is traveling through the chamber in the outward direction to cause the STF to react with a second shear threshold effect, and
  - a set of fluid flow sensors positioned proximal to the chamber, wherein the set of fluid flow sensors provide a fluid response from the STF, and
  - a set of fluid manipulation emitters positioned proximal to the chamber, wherein the set of fluid manipulation emitters provide a fluid activation to at least one of the STF, the first piston bypass, the electric motor, and the second piston bypass to control the motion of the piston.

2. The head unit device of claim 1, wherein the head unit device further comprises:

- a plunger between the rotary-motion-to-linear-motion conversion device and the piston, the plunger configured to apply a force from the door to move the piston within the chamber.

3. The head unit device of claim 2, wherein the head unit device further comprises:

- a plunger bushing to guide the plunger into the chamber in response to the force from the door,
- wherein the plunger bushing facilitates containment of the STF within the chamber, wherein the plunger bushing remains in a fixed position relative to the chamber when the force from the door moves the piston within the chamber.

4. The head unit device of claim 1, wherein the STF comprises:

- a plurality of nanoparticles, wherein the plurality of nanoparticles includes one or more of an oxide, calcium carbonate, synthetically occurring minerals, naturally occurring minerals, polymers, $SiO_2$, polystyrene, polymethylmethacrylate, or a mixture thereof.

5. The head unit device of claim 1, wherein the STF comprises:

- one or more of ethylene glycol, polyethylene glycol, ethanol, silicon oils, phenyltrimethicone, or a mixture thereof.

6. The head unit device of claim 1, wherein the head unit device further comprises:

- a piston bypass between opposite sides of the piston, wherein the piston bypass facilitates flow of a portion of the STF between the opposite sides of the piston when the piston travels through the chamber in the inward or the outward direction.

7. The head unit device of claim 1, wherein the head unit device further comprises:

- a chamber bypass between opposite ends of the chamber, wherein the chamber bypass facilitates flow of a portion of the STF between the opposite ends of the chamber when the piston travels through the chamber in the inward or the outward direction.

8. The head unit device of claim 1, wherein the set of fluid flow sensors comprises one or more of:

- a mechanical position sensor, an image sensor,
a light sensor,
an audio sensor,
a microphone,
an ultrasonic sound sensor,
an electric field sensor,
a magnetic field sensor, and
a radio frequency wireless field sensor.

9. The head unit device of claim 1, wherein the set of fluid manipulation emitters comprises one or more of:
a mechanical vibration generator,
an image generator,
a light emitter,
an audio transducer,
a speaker,
an ultrasonic sound transducer,
an electric field generator,
a magnetic field generator, and
a radio frequency wireless field transmitter.

10. A method for execution by a computing device, the method comprises:
interpreting a fluid response from a set of fluid flow sensors to produce a piston position of a piston associated with a head unit device of a head unit system, wherein the set of fluid flow sensors are positioned proximal to the head unit device for controlling motion of the piston, wherein the head unit system includes:
a rotary-motion-to-linear-motion conversion device, wherein the rotary-motion-to-linear-motion conversion device is configured to convert rotary motion of a camshaft to linear motion of the piston,
an electric motor coupled to the camshaft, wherein the electric motor is configured to provide one or more of propulsion of the camshaft in a rotary fashion, position control of the camshaft, and energy harvested from the rotary motion of the camshaft when propelled by another entity,
a door hinge coupled to the camshaft and to a door, wherein the door hinge is configured to provide the rotary motion of the camshaft when propelled by the door, and the head unit device, wherein the head unit device includes:
shear thickening fluid (STF), wherein the STF is configured to have a decreasing viscosity in response to a first range of shear rates and an increasing viscosity in response to a second range of shear rates, wherein the second range of shear rates are greater than the first range of shear rates,
a chamber, the chamber configured to contain a portion of the STF, wherein the chamber includes a front channel and a back channel,
the piston housed at least partially radially within the chamber and separating the back channel and the front channel, the piston configured to exert pressure against the shear thickening fluid in response to movement of the piston from a force applied to the piston, wherein the movement of the piston includes one of traveling through the chamber in an inward direction or traveling through the chamber in an outward direction, wherein the piston travels toward the back channel and away from the front channel when traveling in the inward direction, wherein the piston travels toward the front channel and away from the back channel when traveling in the outward direction, wherein the piston includes:
a first piston bypass between opposite sides of the piston that controls flow of the STF between the opposite sides of the piston from the back channel to the front channel when the piston is traveling through the chamber in the inward direction to cause the STF to react with a first shear threshold effect, and
a second piston bypass between the opposite sides of the piston that controls flow of the STF between the opposite sides of the piston from the front channel to the back channel when the piston is traveling through the chamber in the outward direction to cause the STF to react with a second shear threshold effect,
the set of fluid flow sensors positioned proximal to the chamber, wherein the set of fluid flow sensors provide the fluid response from the STF, and
a set of fluid manipulation emitters positioned proximal to the chamber, wherein the set of fluid manipulation emitters provide a fluid activation to at least one of the STF, the first piston bypass, and the second piston bypass to control the motion of the piston;
interpreting the piston position to produce a door position of the door;
determining parameters for wireless signals based on the door position, wherein a wireless communication modem associated with the head unit system communicates the wireless signals with a second wireless communication modem associated with another computing device; and
facilitating utilization of the parameters for the wireless signals to promote successful communication of status and/or control of the head unit system via the wireless signals.

11. The method of claim 10, wherein the interpreting the fluid response from the set of fluid flow sensors to produce the piston position of the piston comprises:
inputting, from one or more fluid flow sensors of the set of fluid flow sensors, a set of fluid flow signals over a time range;
determining the fluid response of the set of fluid flow sensors based on the set of fluid flow signals;
determining a piston velocity based on the fluid response of the set of fluid flow sensors over the time range; and
determining the piston position based on the piston velocity and a real-time reference.

12. The method of claim 10, wherein the interpreting the piston position to produce the door position of the door comprises:
interpreting mapping data recovered from a chamber database based on the piston position to produce the door position;
performing a wireless communication test utilizing the wireless communication modem to produce a communication viability result; and
updating the door position to include the communication viability result.

13. The method of claim 10, wherein the determining the parameters for wireless signals based on the door position comprises one or more of:
recovering the parameters from a chamber database based on the door position;
performing a set of wireless communication tests utilizing the wireless communication modem in accordance with default parameters for wireless signals to update the default parameters for wireless signals to produce the parameters for wireless signals; and selecting the parameters for wireless signals based on status information about a set of doors associated with a wireless path traversed by the wireless signals between the wireless communication modem and the second wireless communication modem, wherein the set of doors includes the door.

14. The method of claim 10, wherein the facilitating utilization of the parameters for the wireless signals to promote the successful communication of the status and/or the control of the head unit system via the wireless signals comprises:

programming a set of wireless communication modems with various aspects associated with the parameters for the wireless signals, wherein the set of wireless communication modems includes the wireless communication modem and the second wireless communication modem; and facilitating one of opening and closing each of one or more doors of a set of doors associated with a wireless path traversed by the wireless signals between the wireless communication modem and the second wireless communication modem to achieve at least one of a threshold wireless signal level and a threshold wireless communication reliability level.

15. A non-transitory computer readable memory comprises:

a first memory element that stores operational instructions that, when executed by a processing module, causes the processing module to:

interpret a fluid response from a set of fluid flow sensors to produce a piston position of a piston associated with a head unit device of a head unit system, wherein the set of fluid flow sensors are positioned proximal to the head unit device for controlling motion of the piston, wherein the head unit system includes:

a rotary-motion-to-linear-motion conversion device, wherein the rotary-motion-to-linear-motion conversion device is configured to convert rotary motion of a camshaft to linear motion of the piston, an electric motor coupled to the camshaft, wherein the electric motor is configured to provide one or more of propulsion of the camshaft in a rotary fashion, position control of the camshaft, and energy harvested from the rotary motion of the camshaft when propelled by another entity, a door hinge coupled to the camshaft and to a door, wherein the door hinge is configured to provide the rotary motion of the camshaft when propelled by the door, and the head unit device, wherein the head unit device includes:

shear thickening fluid (STF), wherein the STF is configured to have a decreasing viscosity in response to a first range of shear rates and an increasing viscosity in response to a second range of shear rates, wherein the second range of shear rates are greater than the first range of shear rates, a chamber, the chamber configured to contain a portion of the STF, wherein the chamber includes a front channel and a back channel, the piston housed at least partially radially within the chamber and separating the back channel and the front channel, the piston configured to exert pressure against the shear thickening fluid in response to movement of the piston from a force applied to the piston, wherein the movement of the piston includes one of traveling through the chamber in an inward direction or traveling through the chamber in an outward direction, wherein the piston travels toward the back channel and away from the front channel when traveling in the inward direction, wherein the piston travels toward the front channel and away from the back channel when traveling in the outward direction, wherein the piston includes:

a first piston bypass between opposite sides of the piston that controls flow of the STF between the opposite sides of the piston from the back channel to the front channel when the piston is traveling through the chamber in the inward direction to cause the STF to react with a first shear threshold effect, and a second piston bypass between the opposite sides of the piston that controls flow of the STF between the opposite sides of the piston from the front channel to the back channel when the piston is traveling through the chamber in the outward direction to cause the STF to react with a second shear threshold effect, the set of fluid flow sensors positioned proximal to the chamber, wherein the set of fluid flow sensors provide the fluid response from the STF, and a set of fluid manipulation emitters positioned proximal to the chamber, wherein the set of fluid manipulation emitters provide a fluid activation to at least one of the STF, the first piston bypass, and the second piston bypass to control the motion of the piston;

a second memory element that stores operational instructions that, when executed by the processing module, causes the processing module to:

interpret the piston position to produce a door position of the door;

a third memory element that stores operational instructions that, when executed by the processing module, causes the processing module to:

determine parameters for wireless signals based on the door position, wherein a wireless communication modem associated with the head unit system communicates the wireless signals with a second wireless communication modem associated with another computing device; and a fourth memory element that stores operational instructions that, when executed by the processing module, causes the processing module to:

facilitate utilization of the parameters for the wireless signals to promote successful communication of status and/or control of the head unit system via the wireless signals.

16. The non-transitory computer readable memory of claim 15, wherein the processing module performs functions to execute the operational instructions stored by the first memory element to cause the processing module to interpret the fluid response from the set of fluid flow sensors to produce the piston position of the piston by:

inputting, from one or more fluid flow sensors of the set of fluid flow sensors, a set of fluid flow signals over a time range;
determining the fluid response of the set of fluid flow sensors based on the set of fluid flow signals;
determining a piston velocity based on the fluid response of the set of fluid flow sensors over the time range; and
determining the piston position based on the piston velocity and a real-time reference.

17. The non-transitory computer readable memory of claim 15, wherein the processing module performs functions to execute the operational instructions stored by the second memory element to cause the processing module to interpret the piston position to produce the door position of the door by:
interpreting mapping data recovered from a chamber database based on the piston position to produce the door position;
performing a wireless communication test utilizing the wireless communication modem to produce a communication viability result; and
updating the door position to include the communication viability result.

18. The non-transitory computer readable memory of claim 15, wherein the processing module performs functions to execute the operational instructions stored by the third memory element to cause the processing module to determine the parameters for wireless signals based on the door position by one or more of:
recovering the parameters from a chamber database based on the door position;
performing a set of wireless communication tests utilizing the wireless communication modem in accordance with default parameters for wireless signals to update the default parameters for wireless signals to produce the parameters for wireless signals; and
selecting the parameters for wireless signals based on status information about a set of doors associated with a wireless path traversed by the wireless signals between the wireless communication modem and the second wireless communication modem, wherein the set of doors includes the door.

19. The non-transitory computer readable memory of claim 15, wherein the processing module performs functions to execute the operational instructions stored by the fourth memory element to cause the processing module to facilitate utilization of the parameters for the wireless signals to promote the successful communication of the status and/or the control of the head unit system via the wireless signals by:
programming a set of wireless communication modems with various aspects associated with the parameters for the wireless signals, wherein the set of wireless communication modems includes the wireless communication modem and the second wireless communication modem; and
facilitating one of opening and closing each of one or more doors of a set of doors associated with a wireless path traversed by the wireless signals between the wireless communication modem and the second wireless communication modem to achieve at least one of a threshold wireless signal level and a threshold wireless communication reliability level.

* * * * *